US008379726B2

(12) United States Patent
Kotaka

(10) Patent No.: US 8,379,726 B2
(45) Date of Patent: Feb. 19, 2013

(54) CODING APPARATUS, CODING METHOD, DECODING APPARATUS, AND DECODING METHOD

(75) Inventor: Naohiko Kotaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 12/194,884

(22) Filed: Aug. 20, 2008

(65) Prior Publication Data

US 2009/0060036 A1  Mar. 5, 2009

(30) Foreign Application Priority Data

Aug. 29, 2007 (JP) ................ P2007-222353

(51) Int. Cl.
*H04N 7/12* (2006.01)
(52) U.S. Cl. .............................. 375/240.16
(58) Field of Classification Search . 375/240.12–240.24
See application file for complete search history.

(56) References Cited

U.S. PATENT DOCUMENTS

| 7,532,808 | B2 * | 5/2009 | Lainema ............... 386/328 |
| 2004/0057515 | A1 * | 3/2004 | Koto et al. ............ 375/240.14 |
| 2007/0171977 | A1 * | 7/2007 | Kudo et al. ............ 375/240.15 |
| 2008/0225951 | A1 * | 9/2008 | Young et al. .......... 375/240.16 |

FOREIGN PATENT DOCUMENTS

| JP | 2004-165703 | 6/2004 |
| JP | 2004-215229 | 7/2004 |
| JP | 2006-94081 | 4/2006 |
| JP | 2007-53561 | 3/2007 |
| WO | WO 03/061297 A1 | 7/2003 |

* cited by examiner

*Primary Examiner* — Mark Rinehart
*Assistant Examiner* — Peter Cheng
(74) *Attorney, Agent, or Firm* — Finnegan, Henderson, Farabow, Garrett & Dunner, LLP

(57) ABSTRACT

A coding apparatus includes: a storage section that stores information for coding an image area to be currently coded in a direct prediction mode that predicts motion information of an image area to be coded by referring to motion information of a previously coded image area; a deriving section that derives motion information of the image area in the direct prediction mode by referring to the information stored in the storage section; a selecting section that selects a prediction mode for coding the image area to be coded, in accordance with the motion information derived by the deriving section; and a determining section that determines information necessary for the deriving section to derive motion information of an uncoded image area, from coding information applied in the prediction mode selected by the selecting section to the image area to be coded, and stores only information determined necessary into the storage section.

10 Claims, 21 Drawing Sheets

FIG. 6

| PARAMETER NAME | RANGE | REQUIRED CODING SIZE PER PARAMETER (bit) | COUNT PER MB | REQUIRED CODING SIZE PER MB (bit) | REQUIRED CODING SIZE PER MB (Byte) |
|---|---|---|---|---|---|
| MvRef | 0x0000 - 0xffff | 16 | 1 | 16 | 2 |
| TOTAL | | 16 | | 16 | 2 |

FIG. 7

| PARAMETER NAME | RANGE | REQUIRED CODING SIZE PER PARAMETER (bit) | COUNT PER MB | REQUIRED CODING SIZE PER MB (bit) | REQUIRED CODING SIZE PER MB (Byte) |
|---|---|---|---|---|---|
| MvRef | 0b0000 - 0b1111 | 4 | 1 | 4 | 1 |
| TOTAL | | 4 | | 4 | 1 |

FIG. 9

| PARAMETER NAME | RANGE | REQUIRED CODING SIZE PER PARAMETER (bit) | COUNT PER MB | REQUIRED CODING SIZE PER MB (bit) | REQUIRED CODING SIZE PER MB (Byte) |
|---|---|---|---|---|---|
| mb_type | 0 - 48 | 6 | 1 | 6 | 1 |
| sub_mb_type | 0 - 12 | 4 | 4 | 16 | 4 |
| ref_idx | 0 - 31 | 5 | 8 | 40 | 8 |
| mv_x | -512.00 - 511.75 | 12 | 32 | 384 | 64 |
| mv_y | -2048.00 - 2047.75 | 14 | 32 | 448 | 64 |
| TOTAL | | 41 | 77 | 894 | 141 |

FIG. 11

| PARAMETER NAME | RANGE | REQUIRED CODING SIZE PER PARAMETER (bit) | COUNT PER MB | REQUIRED CODING SIZE PER MB (bit) | REQUIRED CODING SIZE PER MB (Byte) |
|---|---|---|---|---|---|
| ref_idx | -1 - 31 | 6 | 4 | 24 | 4 |
| mv_x | -512.00 - 511.75 | 12 | 16 | 192 | 32 |
| mv_y | -2048.00 - 2047.75 | 14 | 16 | 224 | 32 |
| TOTAL | | 32 | 36 | 440 | 68 |

FIG. 12

| PARAMETER NAME | RANGE | REQUIRED CODING SIZE PER PARAMETER (bit) | COUNT PER MB | REQUIRED CODING SIZE PER MB (bit) | REQUIRED CODING SIZE PER MB (Byte) |
|---|---|---|---|---|---|
| ref_idx | -1 - 31 | 6 | 4 | 24 | 4 |
| mv_x | -512.00 - 511.75 | 12 | 4 | 48 | 8 |
| mv_y | -2048.00 - 2047.75 | 14 | 4 | 56 | 8 |
| TOTAL | | 32 | 16 | 128 | 20 |

CODING APPARATUS, CODING METHOD, DECODING APPARATUS, AND DECODING METHOD

CROSS REFERENCES TO RELATED APPLICATIONS

The present invention contains subject matter related to Japanese Patent Application JP 2007-222353 filed in the Japanese Patent Office on Aug. 29, 2007, the entire contents of which are incorporated herein by reference.

BACKGROUND OF THE INVENTION

1. Field of the Invention

The present invention relates to a coding apparatus and a coding method for applying coding to an image signal for output, and a decoding apparatus and a decoding method for decoding a coded image signal for output.

2. Description of the Related Art

H.264/MPEG4 AVC (hereinafter, referred to as AVC) has been standardized as a system that realizes a coding efficiency nearly twice that of image coding schemes of the related art such as MPEG2 and MPEG4. The AVC standard is similar in processing to the above-mentioned image coding schemes of the related art in that an image signal is coded by using an orthogonal transform process and a motion compensation process. However, as opposed to image coding schemes of the related art, the AVC standard realizes a relatively high coding efficiency due to the high degree of freedom in terms of coding tools used when coding each element constituting a coding process (see Japanese Unexamined Patent Application Publication No. 2006-94081).

A coding process conforming to the above AVC standard is realized by, for example, a coding apparatus shown in FIG. 20.

A coding apparatus 8 includes a subtraction section 81, an orthogonal transform section 82, a quantization section 83, an inverse quantization section 84, an inverse orthogonal transform section 85, an addition section 86, a pixel storage memory 87, an ME/MD processing section 88, a parameter storage memory 89, an intra prediction section 90, an inter prediction section 91, and a coding section 92.

The subtraction section 81 subtracts a predicted pixel generated by the intra prediction section 90 or the inter prediction section 91 described later from an inputted pixel, and supplies the resulting difference pixel to the orthogonal transform section 82.

The orthogonal transform section 82 applies an orthogonal transform to the difference pixel supplied from the subtraction section 81, in units of a macroblock made up of a plurality of pixels. Then, the orthogonal transform section 82 supplies orthogonal transform coefficients within the orthogonal transformed macroblock to the quantization section 83.

The quantization section 83 quantizes, in accordance with quantization parameters, the orthogonal transform coefficients within each macroblock supplied from the orthogonal transform section 82, and supplies the quantized orthogonal transform coefficients to the coding section 92. Then, the coding section 92 outputs a bit stream obtained by applying variable-length coding or the like to the quantized orthogonal transform coefficients supplied from the quantization section 83. The AVC standard specifies that coding be carried out through variable-length coding such as Context-based Adaptive Variable-Length Coding (CAVLC) or Context-based Adaptive Binary Arithmetic Coding (CABAC).

The quantization section 83 supplies the quantized orthogonal transform coefficients to the coding section 92, and also to the inverse quantization section 84, the ME/MD processing section 88, and the parameter storage memory 89.

The inverse quantization section 84 inverse quantizes the quantized orthogonal transform coefficients in accordance with the quantization parameters used in the quantization section 83, and supplies the inverse quantized orthogonal transform coefficients to the inverse orthogonal transform section 85.

The inverse orthogonal transform section 85 converts each of the orthogonal transform coefficients within each macroblock supplied from the inverse quantization section 84, into a difference pixel constituting this macroblock, and supplies the difference pixel to the addition section 86.

The addition section 86 adds the difference pixel supplied from the inverse orthogonal transform section 85 and a predicted pixel supplied from the intra prediction section 90 or the inter prediction section 91 described later together to thereby generate a reference pixel, and supplies the reference pixel to the pixel storage memory 87.

The pixel storage memory 87 stores the difference pixel supplied from the addition section 86 on a picture-by-picture basis. Let the current picture to be coded be P(N)(N is a natural number), and a picture that was coded M (M is a natural number) pictures prior be P(N-M), the pixel storage memory 87 has already stored reference pixels corresponding to P(N-1), P(N-2), . . . , P(N-M). Since these reference pixels are used in the ME/MD processing section 88 and the inter prediction section 91 described later, the pixel storage memory 87 stores these reference pixels for a fixed period of time.

The ME/MD processing section 88 carries out a motion estimation (ME) process and a mode decision (MD) process with respect to the current macroblock being coded, specifically by referring to coding information stored in the parameter storage memory 89 as described later. Then, in accordance with the results of the ME process and MD process, the ME/MD processing section 88 decides the best prediction mode for the macroblock being currently processed. Further, the ME/MD processing section 88 supplies information necessary for intra prediction to the intra prediction section 90 upon selecting intra prediction as the best prediction mode, and supplies information necessary for inter prediction to the inter prediction section 91 upon selecting inter prediction as the best prediction mode.

The parameter storage memory 89 stores information related to previously coded pictures P(N-1), P(N-2), . . . , P(N-M), which is required for the ME/MD processing section 88 to code the current macroblock to be coded in skip/direct mode described later, from among pieces of information supplied from the quantization section 83.

The intra prediction section 90 generates predicted pixels from already coded pixels within a picture in which the current macroblock to be coded exists, in accordance with the results of decision by the ME/MD processing section 88, and supplies the predicted pixels to the subtraction section 81 and the addition section 86.

The inter prediction section 91 generates predicted pixels by using reference pixels stored in the pixel storage memory 87, in accordance with the results of decision by the ME/MD processing section 88, and supplies the predicted pixels to the subtraction section 81 and the addition section 86.

Next, the specific configuration of the ME/MD processing section 88 and its operation will be described with reference to FIG. 21.

The ME/MD processing section 88 includes an intra search processing section 101 that selects the best mode from among intra prediction modes, a skip/direct search processing section 102 that refers to information stored in the parameter storage memory 89 to obtain motion information in skip/direct prediction mode, an L0/L1/Bi search processing section 103 that obtains the best mode and motion information related to other prediction modes, and an MD processing section 104 that selects the best mode from among the modes selected by the respective search processing sections.

The intra search processing section 101 selects the best mode from among intra prediction modes in accordance with the image signal of an input pixel to be coded, and supplies information related to a coding process corresponding to the selected mode, to the MD processing section 104.

The skip/direct search section 102 includes an MV deriving section 105 that derives motion vectors in spatial direct mode and motion vectors in temporal direct mode, from among skip/direct prediction modes described later, with respect to a macroblock of which the slice type is B slice, and a post-processing section 106 that selects the best prediction mode in accordance with the motion vectors derived by the MV deriving section 105.

The MV deriving section 105 refers to information stored in the parameter storage memory 89 to derive motion vectors in spatial direct mode and motion vectors in temporal direct mode as described later, and supplies the derived motion vectors to the post-processing section 106.

The post-processing section 106 selects the best mode from among skip/direct prediction modes by using the motion vectors derived by the MV deriving section 105, and supplies to the MD processing section 104 information related to a coding process corresponding to the selected mode.

The L0/L1/Bi search processing section 103 selects the best mode from among a prediction (L0 prediction) using pictures located forward of the current picture to be coded in display order, a prediction (L1 prediction) using pictures located backward of the current picture to be coded in display order, and a prediction (Bi prediction) using pictures located both forward and backward of the current picture to be coded in display order. The L0/L1/Bi search processing section 103 then supplies information related to a coding process corresponding to the selected mode, to the MD processing section 104.

In the following, the description will be focused on the processing of the MV deriving section 105, which derives motion vectors in skip/direct prediction mode, of the processing sections included in the ME/MD processing section 88 described above.

The MV deriving section 105 derives motion vectors by different processes between spatial direct mode and temporal direct mode.

First, a motion vector derivation process in spatial direct mode will be described with to a flowchart as shown in FIG. 22.

In step S101, the MV deriving section 105 derives, from coding information of macroblocks adjacent to a macroblock to be coded, reference picture indices refIdxL0/refIdxL1 indicating reference pictures for coding the macroblock to be coded by L0 prediction and L1 prediction, and a flag directZeroPredictionFlag indicating whether or not a motion vector in direct mode is zero, and the processing proceeds to step S102.

In step S102, the MV deriving section 105 derives the motion vector mvCol of an anchor block, and the reference picture index refIdxCol of the anchor block by inputting mbPartIdx indicating the position of a 8×8 block within a macroblock to be coded, and subMbPartIdx indicating the position of a 4×4 pixel block within a sub-macroblock, and proceeds to step S103. Here, an anchor picture refers to a picture with the lowest valued reference picture index in L1 prediction. Further, an anchor block refers to a block of an anchor picture which is at the same spatial position as the block to be coded. Normally, the closest reference picture located backward of the picture to be coded in display order is selected as the anchor picture.

In step S103, the MV deriving section 105 determines whether or not the information related to the anchor picture derived in step S102 satisfies all of the first to third conditions described below.

That is, as the first condition, the MV deriving section 105 determines whether or not the values of mvCol[0] and mvCol[1] respectively indicating the magnitudes of the motion vector of an anchor block in the horizontal and vertical directions are both equal to or less than ±1.

Further, as the second condition, the MV deriving section 105 determines whether or not the reference picture index refIdxCol of a reference picture for an anchor block is 0, that is, whether or not an anchor picture is the closest reference picture located backward of the picture to be coded in display order.

Further, as the third condition, the MV deriving section 105 determines whether or not the picture type RefPicList1[0] of the lowest valued reference picture index of L1 prediction is short-time reference picture.

The MV deriving section 105 determines whether or not all of the first to third conditions described above are satisfied. Then, the MV deriving section 105 proceeds to step S104 if all of the conditions are satisfied, and proceeds to step S105 if not all of the conditions are satisfied.

In step S104, the MV deriving section 105 sets a flag ColZeroFlag to 1 and proceeds to step S106.

In step S105, the MV deriving section 105 sets the flag ColzeroFlag to 0 and proceeds to step 5106.

In step S106, the MV deriving section 105 derives the vector X representing the horizontal direction and vertical direction of the motion vector of the macroblock to be coded, and proceeds to step S107.

In step S107, the MV deriving section 105 makes a condition determination on the basis of the motion information of adjacent macroblocks refIdxL0, refIdxL1, and directZeroPredictionFlag, and the flag ColZeroFlag set in step S106. If a predetermine d condition is satisfied, the MV deriving section 105 proceeds to step S108, and if the predetermined condition is not satisfied, the MV deriving section 105 proceeds to step S109.

In step S108, the MV deriving section 105 sets both the vertical and horizontal values of the motion vector mvLX of the macroblock to be coded in spatial direct mode to 0, and terminates the procedure.

In step S109, the MV deriving section 105 derives the motion vector mvLX of the macroblock to be coded in spatial direct mode by using motion information of adjacent macroblocks, and terminates the procedure.

Further, the procedure for deriving motion information of an anchor block in step S102 is carried out by the MV deriving section 105 in accordance with a flowchart as shown in FIG. 23.

In step S201, the MV deriving section 105 derives information related to an anchor picture, and proceeds to step S202.

In step S202, the MV deriving section 105 derives the following pieces of information related to an anchor block from the information derived in step S202, by referring to information stored in the parameter storage memory 19.

That is, the MV deriving section 105 derives the macroblock address mbAddrCol of the anchor block, the block index mbPartIdxCo indicating a 8×8 pixel block within a macroblock of the anchor block, the block index subMbPartIdxCol indicating a 4×4 pixel block within a sub-macroblock of the anchor block, the flag predFlagL0Col indicating the prediction mode of L0 prediction of the anchor block, the flag predFlagL1Col indicating the prediction mode of L1 prediction of the anchor block, the macroblock type mb_type of the anchor block, the motion vector MvL0[mbPartIdxCol][subMbPartIdxCol] of L0 prediction of the anchor block, the reference picture index RefIdxL0[mbPartIdxCol] of L0 prediction of the anchor block, the motion vector MvL1[mbPartIdxCol][subMbPartIdxCol] of L1 prediction of the anchor block, the reference picture index RefIdxL1[mbPartIdxCol] of L1 prediction of the anchor block, and the ratio vertMvScale between vertical components of the motion vector of the anchor block and motion vector of the macroblock to be coded. Then, the MV deriving section 105 proceeds to step S203.

In step S203, the MV deriving section 105 determines the prediction mode of the anchor block, from the macroblock type of the anchor block derived in step 3202 and its prediction mode, and proceeds to step S204 or step S205 depending on the result of the determination.

In step S204, the MV deriving section 105 sets both the horizontal and vertical components of the motion vector mvCol of the anchor block to 0 and also sets the reference picture index refIdxCol of the anchor block to −1, and then proceeds to step S103.

In step S205, the MV deriving section 105 determines whether or not the value of the flag pregFlagL0Col indicating the prediction mode of L0 prediction of the anchor block is 1. The MV deriving section 105 proceeds to step S206 if the value is 1, and proceeds to step S207 if the value is not 1.

In step S206, the MV deriving section 105 sets the motion vector mvCol of the anchor block to the motion vector MvL0 [mbPartIdxCol][subMbPartIdxCol] of L0 prediction of the anchor block, sets the reference picture index refIdxCol of the anchor block to the reference picture index RefIdxL0[mbPartIdxCol] of L0 prediction of the anchor block, and proceeds to step S103.

In step S207, the MV deriving section 105 sets the motion vector mvCol of the anchor block to the motion vector MvL1 [mbPartIdxCol][subMbPartIdxCbl] of L1 prediction of the anchor block, sets the reference picture index refIdxCol of the anchor block to the reference picture index RefIdxL1[mbPartIdxCol] of L1 prediction of the anchor block, and proceeds to step S103.

Next, a motion vector derivation process in temporal direct mode will be described with reference to a flowchart shown in FIG. 24.

In step S301, the MV deriving section 105 derives, as information of the anchor block, information of an anchor picture colPic, the macroblock address mbAddrCol of the anchor block, the motion vector mvCol of the anchor block, the reference picture index refIdcCol of the anchor block, and the ratio vertMvScale between vertical components of the motion vector of the anchor block and motion vector of the macroblock to be coded, by inputting mbPartIdx indicating the position of a 8×8 pixel block within the macroblock to be coded, and subPartIdx indicating the position of a 4×4 pixel block within a sub-macroblock. Then, the MV deriving section 105 proceeds to step S302.

In step S302, the MV deriving section 105 derives the reference picture index refIdxL0 of L0 prediction and the reference picture index refIdxL1 of L1 prediction from the information derived in step S301, and proceeds to step S303.

In step S303, the MV deriving section 105 modifies the motion vector mvCol of the anchor block and proceeds to step S304.

In step S304, the MV deriving section 105 derives the current picture to be coded currPic0rField, a picture pic0 with the lowest index of reference pictures of L0 prediction, and a picture pic1 with the lowest index of reference pictures of L1 prediction, and proceeds to step S305. In step S305, the MV deriving section 105 derives the motion vector mvL0 of L0 prediction of the anchor block and the motion vector mvL1 of L1 prediction of the anchor block, from the relationship in display order between currPic0rField, pic0, and pic1 derived in step S304.

In this way, the MV deriving section 105 derives motion vectors in spatial direct mode and temporal direct mode. At this time, to derive these motion vectors, coding information of one of previously coded pictures P(n-m), . . . , P(N-2), P(N-1) is required. Therefore, in the parameter storage memory 89, coding information of pictures needs to be stored for a period of time during which the pictures can serve as reference images.

For example, according to the AVC standard, coding information of a maximum of 32 pictures needs to be stored in the parameter storage memory 89. Therefore, the parameter storage memory 89 needs to temporarily store the amount of data represented by the expression below in a predetermined memory space.

(Coding information per each reference macroblock according to direct prediction mode)×(the number of macroblocks forming one picture)×(the maximum number of reference pictures)

Therefore, in a case where the parameter storage memory 89 is provided inside the coding apparatus 8, it is necessary to provide an expensive SRAM inside the apparatus. Further, in a case where the parameter storage memory 89 is provided outside the coding apparatus 8, an external memory with a relatively large capacity is required, which makes it necessary to secure a wide bandwidth for communication of data between the coding apparatus 8 and this external memory.

For example, the size of coding information per each reference macroblock according to direct prediction mode is 141[Byte] when the coding size of each parameter is byte aligned, for example. Hence, to apply coding to an image signal with an image size of 1320×1080, since one picture is made up of 8160 macroblocks, a memory space of 1109760 (=141[Byte]×8160)[Byte] or approximately 1.1 [MByte] is required for the parameter storage memory 89. Further, in the case of a configuration where the parameter storage memory 89 is provided outside of the coding apparatus 8, if the frame rate of an image signal to be coded is 30 [fps], a maximum of 528(=1.1[MByte]×8[bit/Byte]×30[fpsix]×2[readwrite]) [Mbps] is required as the bandwidth of bus connection between an external memory and the coding apparatus 8.

SUMMARY OF THE INVENTION

It is desirable to provide a coding apparatus and a coding method which reduce the amount of information stored into storage means for storing information used for coding an image area to be currently coded in direct prediction mode that predicts motion information of an image area to be coded by using motion information of a previously coded image area, thereby realizing a reduction in the required storage capacity of the storage means.

It is also desirable to provide a decoding apparatus and a decoding method which reduce the amount of information stored into storage means for storing information used for decoding an image area to be currently decoded in direct prediction mode that predicts motion information of an image area to be decoded by using motion information of a previously decoded image area, thereby realizing a reduction in the required storage capacity of the storage means.

According to an embodiment of the present invention, there is provided a coding apparatus that applies coding to an image signal in a prediction mode and in units of an image area which conform to a predetermined coding scheme, and outputs the coded image signal, including: storage means for storing information used for coding an image area to be currently coded in a direct prediction mode that predicts motion information of an image area to be coded by referring to motion information of a previously coded image area; deriving means for deriving motion information of the image area in the direct prediction mode by referring to the information stored in the storage means; selecting means for selecting a prediction mode for coding the image area to be coded, in accordance with the motion information derived by the deriving means; and determining means for determining information necessary for the deriving means to derive motion information of an image area to which the coding has not been applied, from coding information applied in the prediction mode selected by the selecting means to the image area to be coded, and storing only information determined as necessary into the storage means.

According to an embodiment of the present invention, there is provided a coding method for applying coding to an image signal in a prediction mode and in units of an image area which conform to a predetermined coding scheme, and outputting the coded image signal, including the steps of: deriving motion information of the image area in a direct prediction mode, which predicts motion information of an image area to be coded by referring to motion information of a previously coded image area, by referring to information stored in storage means for storing information used for coding an image area to be currently coded in the direct prediction mode; selecting a prediction mode for coding the image area to be coded, in accordance with the derived motion information; and determining information necessary for deriving motion information of an image area to which the coding has not been applied, from coding information applied in the selected prediction mode to the image area to be coded, and storing only information determined as necessary into the storage means.

According to an embodiment of the present invention, there is provided a decoding apparatus that decodes coded data obtained by applying coding to an image signal in a prediction mode and in units of an image area which conform to a predetermined coding scheme, including: storage means for storing information used for decoding an image area to be currently decoded in a direct prediction mode that predicts motion information of an image area to be decoded by referring to motion information of a previously decoded image area; deriving means for deriving-motion information of the image area in the direct prediction mode by referring to the information stored in the storage means; and determining means for determining information necessary for the deriving means to derive motion information of an image area to which the decoding has not been applied, from the motion information of the image area derived by the deriving means, and storing only information determined as necessary into the storage means.

According to an embodiment of the present invention, there is provided a decoding method for decoding coded data obtained by applying coding to an image signal in a prediction mode and in units of an image area which conform to a predetermined coding scheme, including the steps of: deriving motion information of the image area in a direct prediction mode, which predicts motion information of an image area to be decoded by referring to motion information of a previously decoded image area, by referring to information stored in storage means for storing information used for decoding an image area to be currently decoded in the direct prediction mode; and determining information necessary for deriving motion information of an image area to which the decoding has not been applied, from the derived motion information of the image area, and storing only information determined as necessary into the storage means.

According to an embodiment of the present invention, information necessary for deriving motion information of an uncoded image area in direct prediction mode, from coding information applied in a selected prediction mode to an image area to be coded is determined, and only information determined as necessary is stored into storage means, thereby making it possible to perform coding while reducing the required storage capacity of the storage means.

According to an embodiment of the present invention, information necessary for deriving motion information of an undecoded image area in direct prediction mode, from derived motion information of an image area is determined, and only information determined as necessary is stored into storage means, thereby making it possible to perform decoding while reducing the required storage capacity of the storage means.

BRIEF DESCRIPTION OF THE DRAWINGS

FIG. 6 is a diagram showing the amount of data stored into a parameter storage memory per macroblock when a constraint of not using temporal direct mode but using spatial direct mode is set;

FIG. 7 is a diagram showing the amount of data stored into a parameter storage memory per macroblock;

FIG. 9 is a diagram showing the amount of data stored into a parameter storage memory per macroblock;

FIG. 11 is a diagram showing the amount of data stored into a parameter storage memory per macroblock;

FIG. 12 is a diagram showing the amount of data stored into a parameter storage memory per macroblock;

DESCRIPTION OF THE PREFERRED EMBODIMENTS

Figure 1:
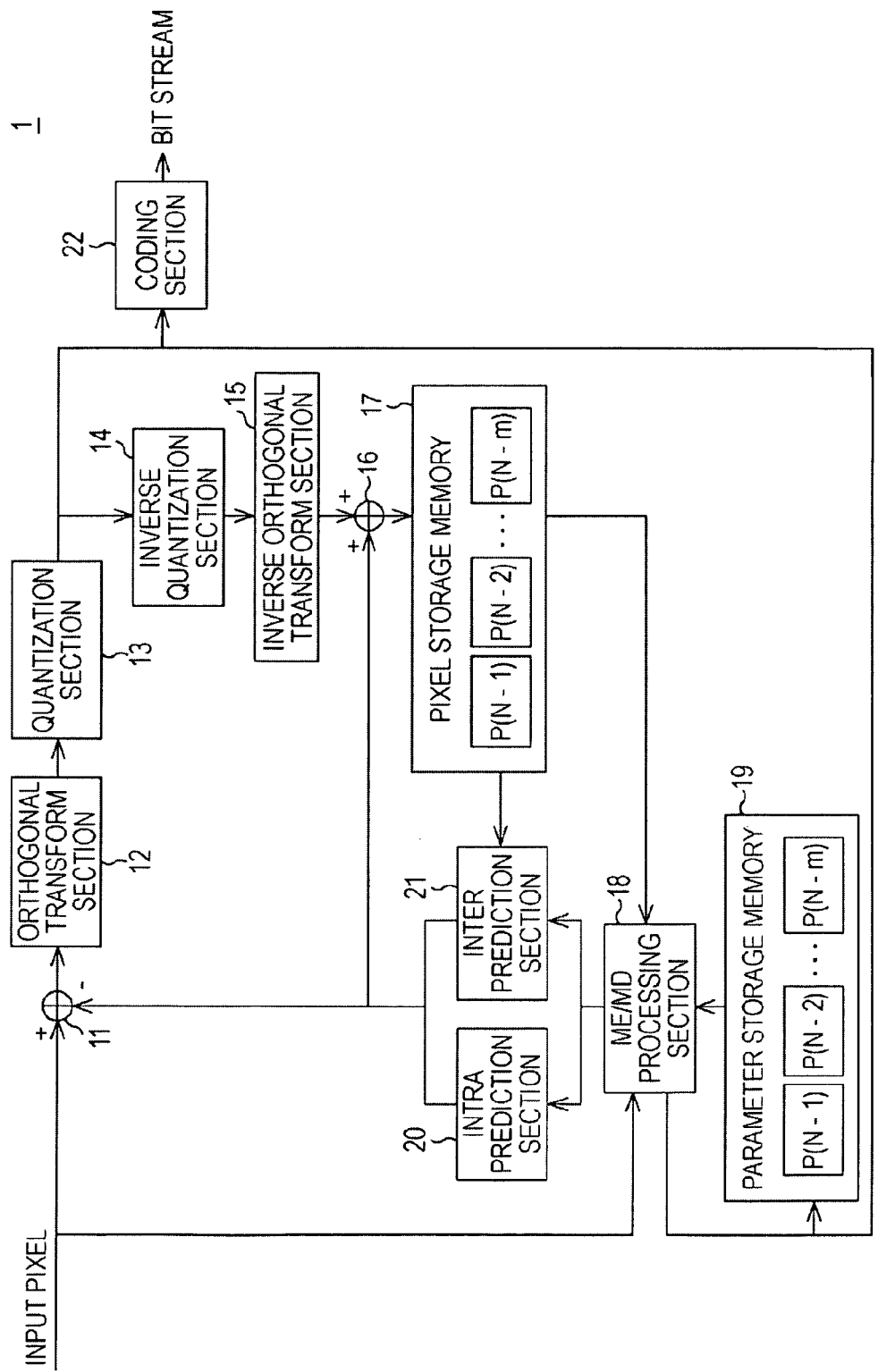
FIG. 1 is a block diagram showing the configuration of a coding apparatus.

An image processing apparatus according to an embodiment of the present invention relates to a coding apparatus that applies coding to an image signal for output, and a decoding apparatus that decodes the coded image signal for output. First, as a specific example of this image processing apparatus, the best mode for carrying out the present invention will be described by way of a coding apparatus 1 as shown in FIG. 1.

The coding apparatus 1 includes a subtraction section 11, an orthogonal transform section 12, a quantization section 13, an inverse quantization section 14, an inverse orthogonal section 15, an addition section 16, a pixel storage memory 17, an ME/MD processing section 18, a parameter storage memory 19, an intra prediction section 20, an inter prediction section 21, and a coding section 22.

The subtraction section 11 subtracts a predicted pixel generated by the intra prediction section 20 or the inter prediction section 21 described later from an input pixel that has been inputted, and supplies the resulting difference pixel to the orthogonal transform section 12.

The orthogonal transform section 12 applies an orthogonal transform to the difference pixel supplied from the subtraction section 11, in units of a macroblock made up of a plurality of pixels. Then, the orthogonal transform section 12 supplies orthogonal transform coefficients within an orthogonal transformed macroblock to the quantization section 13.

The quantization section 13 quantizes, in accordance with quantization parameters, the orthogonal transform coefficients within each macroblock supplied from the orthogonal transform section 12, and supplies the quantized orthogonal transform coefficients to the coding section 22. Then, the coding section 22 outputs a bit stream obtained by applying variable-length coding or the like to the quantized orthogonal transform coefficients supplied from the quantization section 13. The AVC standard specifies that coding be carried out through variable-length coding such as Context-based Adaptive Variable-Length Coding (CAVLC) or Context-based Adaptive Binary Arithmetic Coding (CABAC).

The quantization section 13 supplies the quantized orthogonal transform coefficients to the coding section 22, and also to the inverse quantization section 14, the ME/MD processing section 18, and the parameter storage memory 19.

The inverse quantization section 14 inverse quantizes the quantized orthogonal transform coefficients in accordance with the quantization parameters used in the quantization section 13, and supplies the inverse quantized orthogonal transform coefficients to the inverse orthogonal transform section 15.

The inverse orthogonal transform section 15 converts each orthogonal transform coefficient within each macroblock supplied from the inverse quantization section 14, into a difference pixel constituting this macroblock, and supplies the difference pixel to the addition section 16.

The addition section 16 adds the difference pixel supplied from the inverse orthogonal transform section 15 and a predicted pixel supplied from the intra prediction section 20 or the inter prediction section 21 described later together to thereby generate a reference pixel, and supplies the reference pixel to the pixel storage memory 17.

Figure 2:
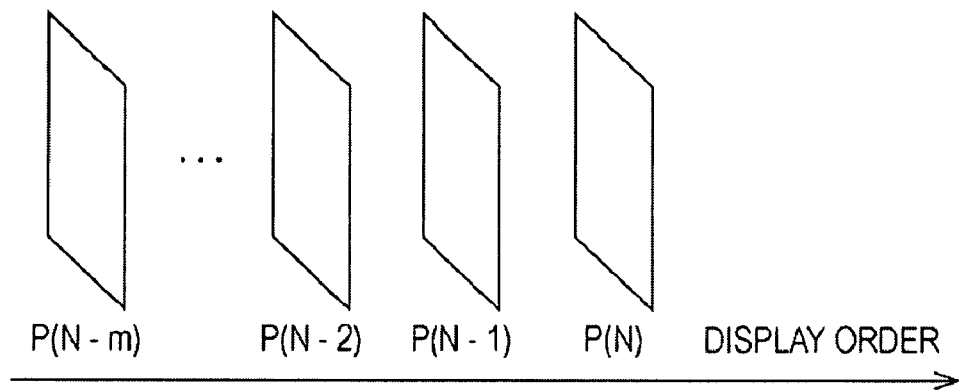
FIG. 2 is a diagram showing pictures arranged in their coding order.

The pixel storage memory 17 stores the reference pixel supplied from the addition section 16 on a picture-by-picture basis. As shown in FIG. 2, let the current picture to be coded be P(N) (N is a natural number), and a picture that was coded M (M is a natural number) pictures prior be P(N-M), the pixel storage memory 17 has already stored reference pixels corresponding to P(N-1), P(N-2), . . . , P(N-M). Since these reference pixels are used in the ME/MD processing section 18 and the inter prediction section 21 described later, the pixel storage memory 17 stores these reference pixels for a fixed period of time.

The ME/MD processing section 18 carries out a motion estimation (ME) process and a mode decision (MD) process with respect to the current macroblock being coded, specifically by referring to coding information stored in the parameter storage memory 19 as described later. Then, in accordance with the results of the ME process and the MD process, the ME/MD processing section 18 decides the best prediction mode for the macroblock being currently processed. Further, the ME/MD processing section 18 supplies information necessary for intra prediction to the intra prediction section 20 upon selecting intra prediction as the best prediction mode, and supplies information necessary for inter prediction to the inter prediction section 21 upon selecting inter prediction as the best prediction mode.

Figure 3:
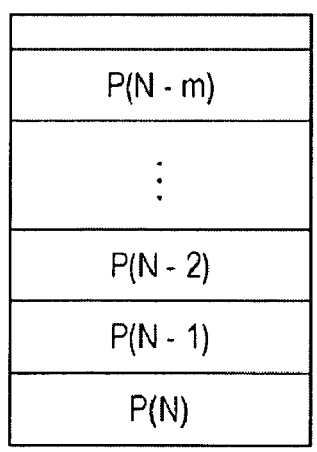
FIG. 3 is a diagram showing storage areas stored in a parameter storage memory.

As shown in FIG. 3, the parameter storage memory 19 stores information related to previously coded pictures P(N-1), P(N-2), . . . , P(N-M), which is required for the ME/MD processing section 18 to code the current macroblock to be coded in accordance with skip/direct mode described later, from among pieces of information supplied from the quantization section 13.

The intra prediction section 20 generates predicted pixels from already coded pixels within a picture in which the current macroblock to be coded exists, in accordance with the results of decision by the ME/MD processing section 11, and supplies the predicted pixels to the subtraction section 11 and the addition section 16.

The inter prediction section 21 generates predicted pixels by using reference pixels stored in the pixel storage memory 17, in accordance with the results of decision by the ME/MD processing section 18, and supplies the predicted pixels to the subtraction section 11 and the addition section 16.

Figure 4:
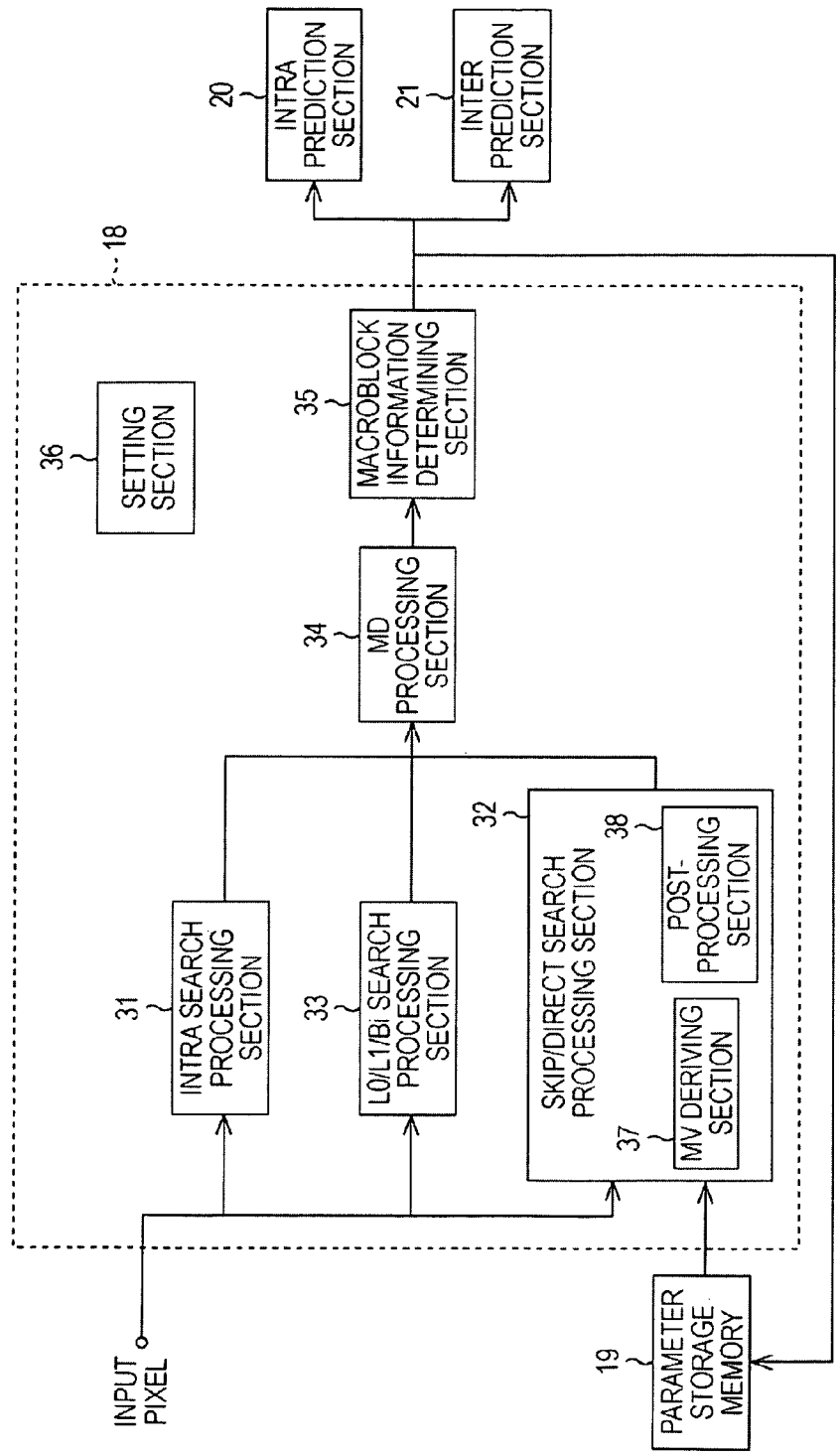
FIG. 4 is a block diagram showing the configuration of an ME/MD processing section.

Next, the specific configuration of the ME/MD processing section 18 and its operation will be described with reference to FIG. 4.

The ME/MD processing section 18 includes an intra search processing section 31 that selects the best mode from among intra prediction modes, a skip/direct search processing section 32 that obtains motion information in skip/direct prediction mode from information stored in the parameter storage memory 19, an L0/L1/Bi search processing section 33 that obtains the best mode and motion information related to other prediction modes, an MD processing section 34 that selects the best mode from among the modes selected by the respective search processing sections, a macroblock information determining section 35 that performs a determination process related to information to be stored into the parameter storage memory 19 in accordance with the prediction mode selected by the MD processing section 34, and a setting section 36 that sets predetermined constraints on the coding process applied to an image signal.

The intra search processing section 31 selects the best mode from among intra prediction modes in accordance with the image signal of an input pixel to be coded, and supplies information related to a coding process corresponding to the selected mode, to the MD processing section 34.

The skip/direct search section 32 includes an MV deriving section 37 that derives motion vectors in spatial direct mode and motion vectors in temporal direct mode, from among skip/direct prediction modes described later, with respect to a macroblock of which the slice type is B slice, and a post-processing section 38 that selects the best prediction mode in accordance with the motion vectors derived by the MV deriving section 37.

The MV deriving section 37 refers to information stored in the parameter storage memory 19 to derive motion vectors in spatial direct mode and motion vectors in temporal direct mode as described later, and supplies the derived motion vectors to the post-processing section 38.

The post-processing section 38 selects the best mode from among skip/direct prediction modes by using the motion vectors derived by the MV deriving section 37, and supplies to the MD processing section 34 information related to a coding process corresponding to the selected mode.

The L0/L1/Bi search processing section 33 selects the best mode from among a prediction (L0 prediction) using pictures located forward of the current picture to be coded in display order, a prediction (L1 prediction) using pictures located backward of the current picture to be coded in display order, and a prediction (Bi prediction) using pictures located both forward and backward of the current picture to be coded in display order. The L0/L1/Bi search processing section 33 then supplies information related to a coding process corresponding to the selected mode, to the MD processing section 34.

The setting section 36 sets the following constraints on the coding process. Specifically, the setting section 36 sets a constraint of not using temporal direct mode but using spatial direct mode of skip/direct prediction modes. Further, the setting section 36 sets a constraint of restricting the block size of a macroblock in a coding process in direct mode to a predetermined size or more, specifically, 8×8 pixel block or more. It should be noted that the constraints set by the setting section 36 are set in accordance with instruction information inputted by operation from a user interface, for example.

The macroblock information determining section 35 causes a part of the derivation process performed by a motion vector deriving section in the related art to be performed in advance when coding of a macroblock that can become a reference macroblock is being performed, thereby realizing a reduction in the amount of data stored into the parameter storage memory 19. In the following, operation according to the ME/MD processing section 18 will be described while focusing on the macroblock information determining section 35 that performs such a process for realizing a reduction in data amount.

The macroblock information determining section 35 performs a determination process related to information that is to be stored into the parameter storage memory 19, in accordance with the constraints set by the setting 36 in addition to information related to the prediction mode selected by the ME/MD processing section 18.

Figure 5:
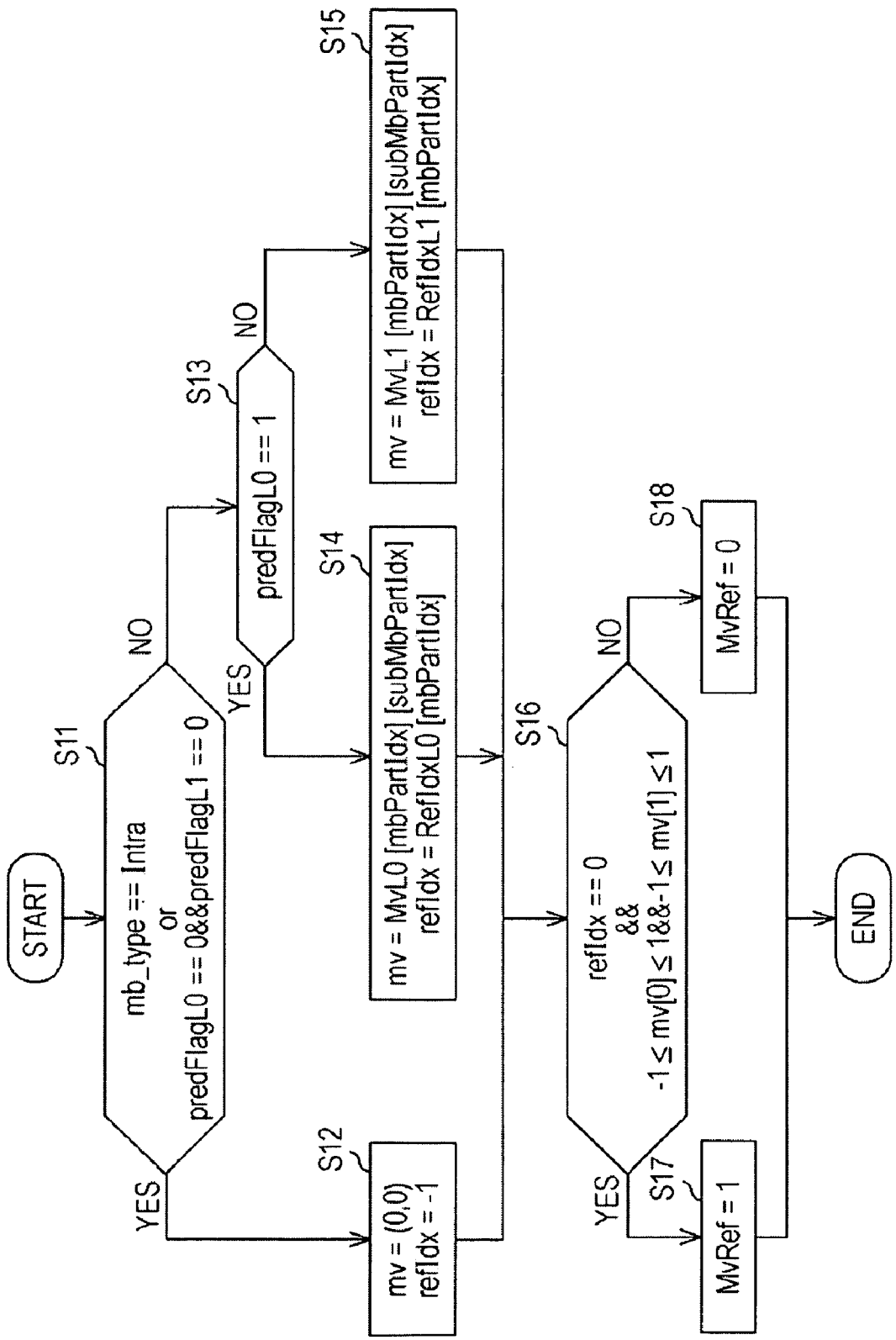
FIG. 5 is a flowchart illustrating a procedure performed by a macroblock information determining section.

First, referring to a flowchart shown in FIG. 5, a description will be given of operation according to the macroblock information determining section 35 in a case when the setting section 36 sets only a constraint of not using temporal direct mode but using spatial direct mode.

Of direct modes, in spatial direct mode, the motion vector of a macroblock to be coded is determined by also referring to motion information of macroblocks located at different positions in the temporal axis direction, so valid anchor block motion vector values need to be stored into the parameter storage memory 19. In contrast, in spatial direct mode, the motion vector of a macroblock to be coded is predicted by using motion vectors of previously coded macroblocks within the corresponding picture. Thus, although information as to whether or not the value of an anchor vector motion vector is ±1 or less is required, no specific value is required.

The macroblock information determining section 35 performs the following determination process so that only information necessary for deriving motion vectors in spatial direct mode having the above-mentioned characteristics are stored is stored into the parameter storage memory 19.

In step S11, as the first condition, the macroblock information determining section 35 determines whether or not the prediction type of the current macroblock to be coded, that is, the prediction type mb_type according to the prediction mode selected by the MD processing section 34 located at the previous stage is Intra. Further, as the second condition, the macroblock information determining section 35 determines whether or not the prediction mode predFlagL0 of L0 prediction of the current macroblock to be coded is 0, and the prediction mode predFlagL1 of L1 prediction is 0. The macroblock information determining section 35 proceeds to step S12 if the first condition or the second condition described above is satisfied, and proceeds to step S13 if neither of the determination conditions is satisfied.

In step S12, the macroblock information determining section 35 sets both the vertical and horizontal values of the motion vector mv of the current macroblock to be coded to 0. Further, the macroblock information determining section 35 sets the reference picture index refIdx of the current macroblock to be coded to −1. Then, the macroblock information determining section 35 proceeds to step S16.

In step S13, the macroblock information determining section 35 determines whether or not the prediction mode predFlagL0 of L0 prediction of the current macroblock to be coded is 1. The macroblock information determining section 35 proceeds to step S14 if this determination condition is satisfied, and proceeds to step S15 if this determination condition is not satisfied.

In step S14, the macroblock information determining section 35 sets the motion vector mv of the current macroblock to be coded to the motion vector MvL0[mbPartIdx][subMbPartIdx] of L0 prediction of this macroblock. Further, the macroblock information determining section 35 sets the reference picture index refIdx of this macroblock to the reference picture index RefIdxL0[mbPartIdx] of L0 prediction of this macroblock. Then, the macroblock information determining section 35 proceeds to step S16.

In step 15, the macroblock information determining section 35 sets the motion vector of the current macroblock to be coded to the motion vector MvL1[mbPartIdx][subMbPartIdX] of L1 prediction of this macroblock. Further, the macroblock information determining section 35 sets the reference picture index refIdx of this macroblock to the reference picture index RefIdxL1[mbPartIdx] of L1 prediction of this macroblock. Then, the macroblock information determining section 35 proceeds to step S16.

In step S16, as the first condition, the macroblock information determining section 35 determines whether or not the reference picture index refIdx of the current macroblock to be coded which is set in the previous processing step is 0. Further, as the second condition, the macroblock information determining section 35 determines whether or not the values of the horizontal and vertical components of the motion vector mv of the current macroblock to be coded set in the previous processing step are both ±1 or less. The macroblock information determining section 35 proceeds to step S17 if both of the first and second conditions are satisfied, and proceeds to step S18 if not both of the first and second conditions are satisfied.

In step S17, the macroblock information determining section 35 sets the values of reference macroblock motion vector MvRef to 1, and stores the set motion vector MvRef into the parameter storage memory 19 and terminates this procedure.

In step S18, the macroblock information determining section 35 sets the values of reference macroblock motion vector MvRef to 0, and stores the set motion vector MvRef into the parameter storage memory 19 and terminates this procedure.

Four kinds of mbPartIdx in total exist per macroblock, and four kinds of subMbPartIdx exist per mbPartIdx. Accordingly, since the value of each motion vector component is always set to 0 or 1 through the procedure according to steps S17 and S18, as shown in FIG. 6, the macroblock information determining section 35 stores motion vectors whose data size is 16 bits (2[Byte]) in total per macroblock into the parameter storage memory 19 as the coding information for reference macroblock.

Further, the macroblock information determining section 35 stores coding information for reference macroblock into the parameter storage memory 19, also when the setting section 36 sets both the constraint of not using temporal direct mode but using spatial direct mode, and the constraint of restricting the macroblock size for a coding process in direct prediction mode to 8×8 or more as described above.

It is specified by the AVC standard that subMbPartIdx=mbPartIdx in a case where the macroblock size for a coding process in direct prediction mode is restricted to a 8×8 pixel block or more. Therefore, through the procedure according to steps S17 and 318, as shown in FIG. 7, the macroblock information determining section 35 stores motion vectors whose data size is 4 bits in total per macroblock as the coding information for reference macroblock, into the parameter storage memory 19. For storage into the parameter storage memory 19 in 1 Byte units, by taking alignment into consideration, the macroblock information determining section 35 stores motion vectors whose data size is 1 [Byte] per macroblock into the parameter storage memory 19.

Figure 8:
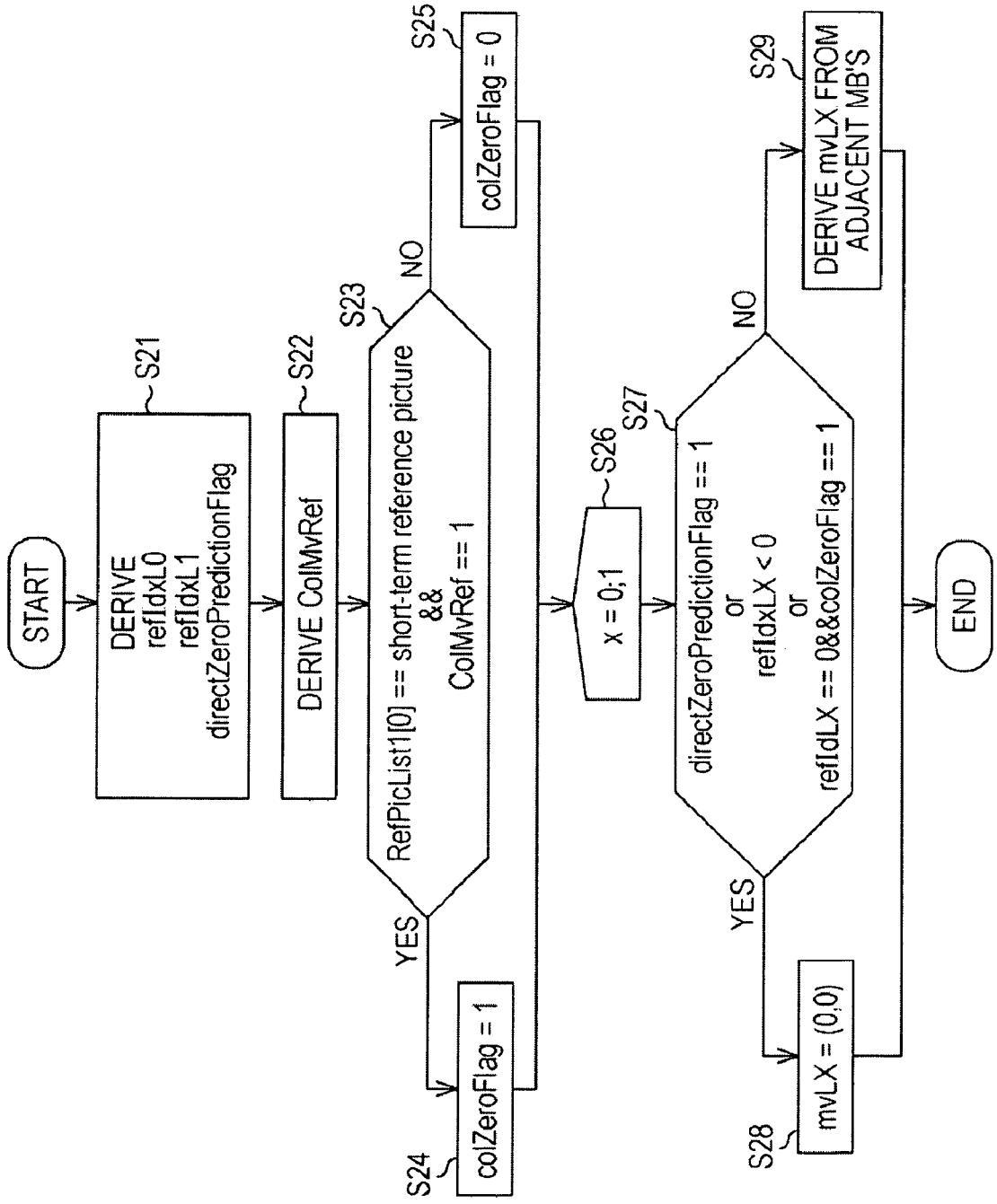
FIG. 8 is a flowchart illustrating a procedure by which an MV deriving section derives motion vectors.

Next, referring to a flowchart shown in FIG. 8, a description will be given of operation of the MV deriving section 37 that derives a motion vector by referring to the motion vector MvRef stored into the parameter storage memory 19 by the macroblock information determining section 35 as described above. As the precondition, the constraint of not using temporal direct mode but using spatial direct mode is set by the setting section 36, so the MV deriving section 37 derives motion vectors in spatial direct mode by the following procedure.

In step S21, the MV deriving section 37 derives, from information related to adjacent macroblocks within the same picture, the reference picture indices refIdxL0 and refIdxL1 of L0 prediction and L1 prediction of the current macroblock to be coded, and the flag directZeroPredictionFlag indicating whether or not a motion vector to be derived is 0. Then, the MV deriving section 37 proceeds to step 322.

In step S22, the MV deriving section 37 derives the motion vector ColMvRef of an anchor block by inputting mbPartIdx, subMbPartIdx to the current macroblock to be coded, and referring to information stored in the parameter storage memory 19.

In step S23, as the first condition, the MV deriving section 37 determines whether or not the picture type RefPicList1[0] of the lowest valued reference index of reference pictures of L1 prediction is short-term reference picture. Further, as the second condition, the MV deriving section 37 determines whether or not the motion vector ColMvRef of the anchor block derived in step S22 is 1. Then, the MV deriving section 37 proceeds to step S24 if both of the first and second conditions are satisfied, and proceeds to step S25 if not both of the first and second conditions are satisfied.

In step S24, the MV deriving section 37 sets the flag colZeroFlag to 1 and proceeds to step S26.

In step S25, the MV deriving section 37 sets the flag colZeroFlag to 0 and proceeds to step S26.

In step S26, the MV deriving section 37 derives the vector X representing the horizontal and vertical directions of the motion vector of the macroblock to be coded, and proceeds to step S27.

In step S27, as the first condition, the MV deriving section 37 determines whether or not the value of the flag directZeroPredictionFlag derived in step S21 is 1. As the second condition, the MV deriving section 37 determines whether or not the reference picture indices refIdxL0 and refIdxL1 derived in step S21 are less than 0. Further, as the third condition, the MV deriving section 37 determines whether or not the reference picture indices refIdxL0 and refIdxL1 derived in step S21 are less than 0, and the flag colZeroFlag set in each of steps S24 and S25 is 1. Then, the MV deriving section 37 proceeds to step S28 if one of the above first to third conditions is satisfied, and proceeds to step S29 if all of the above first to third conditions are not satisfied.

In step S28, the MV deriving section 37 sets both the vertical and horizontal values of the motion vector mvLX of the macroblock to be coded in spatial direct mode to 0, and terminates the procedure.

In step S29, the MV deriving section 37 derives the motion vector mvLX of the macroblock to be coded in spatial direct mode by using motion information of adjacent macroblocks, and terminates the procedure.

In this way, the MV deriving section 37 derives motion vectors in temporal direct mode. At this time, in step S22, the MV deriving section 37 can derive the motion vector of the anchor block corresponding to the inputted mbPartIdx, subMbPartIdx only by referencing the parameter storage memory 19. This is because when the anchor block was a block to be coded in the past, the motion vector for the anchor block was obtained and stored into the parameter storage memory by the macroblock information determining section 35 in advance. In the coding apparatus of the related art, such processing according to the macroblock information determining section is not performed in advance in the ME/MD processing section, the Mv deriving section derives the motion vector of the anchor block. Thus, for the MV deriving section to derive the motion vector of an anchor block, for example, coding information of 894 bits per macroblock, or about 140[Byte] if alignment is taken into account for every parameter need to be stored in the parameter storage memory as shown in FIG. 9.

Therefore, with the coding apparatus 1 according to this embodiment, in accordance with the prediction mode selected by the MD processing section 34, and the constraints set by the setting section 36, the macroblock information determining section 35 determines information necessary for the MV deriving section 37 to derive the motion vector of a macroblock that has not been coded from information related to a macroblock to be coded, with this macroblock as a reference macroblock, and stores only information determined as necessary into the parameter storage memory 19, thereby making it possible to reduce the required storage capacity of the parameter storage memory 19 in comparison to the related art.

For example, as described above, in the coding apparatus 1, the setting section 36 sets a constraint of not using temporal direct mode but using spatial direct mode, which makes it possible to reduce the storage size of data stored into the parameter storage memory 19 to about 1/70 of that in the related art. In the coding apparatus 1, the setting section 36 further sets a constraint of restricting the macroblock size to a 8×8 pixel size or more, which makes it possible to reduce the storage size of data stored into the parameter storage memory 19 to about 1/282 of that in the related art.

Figure 10:
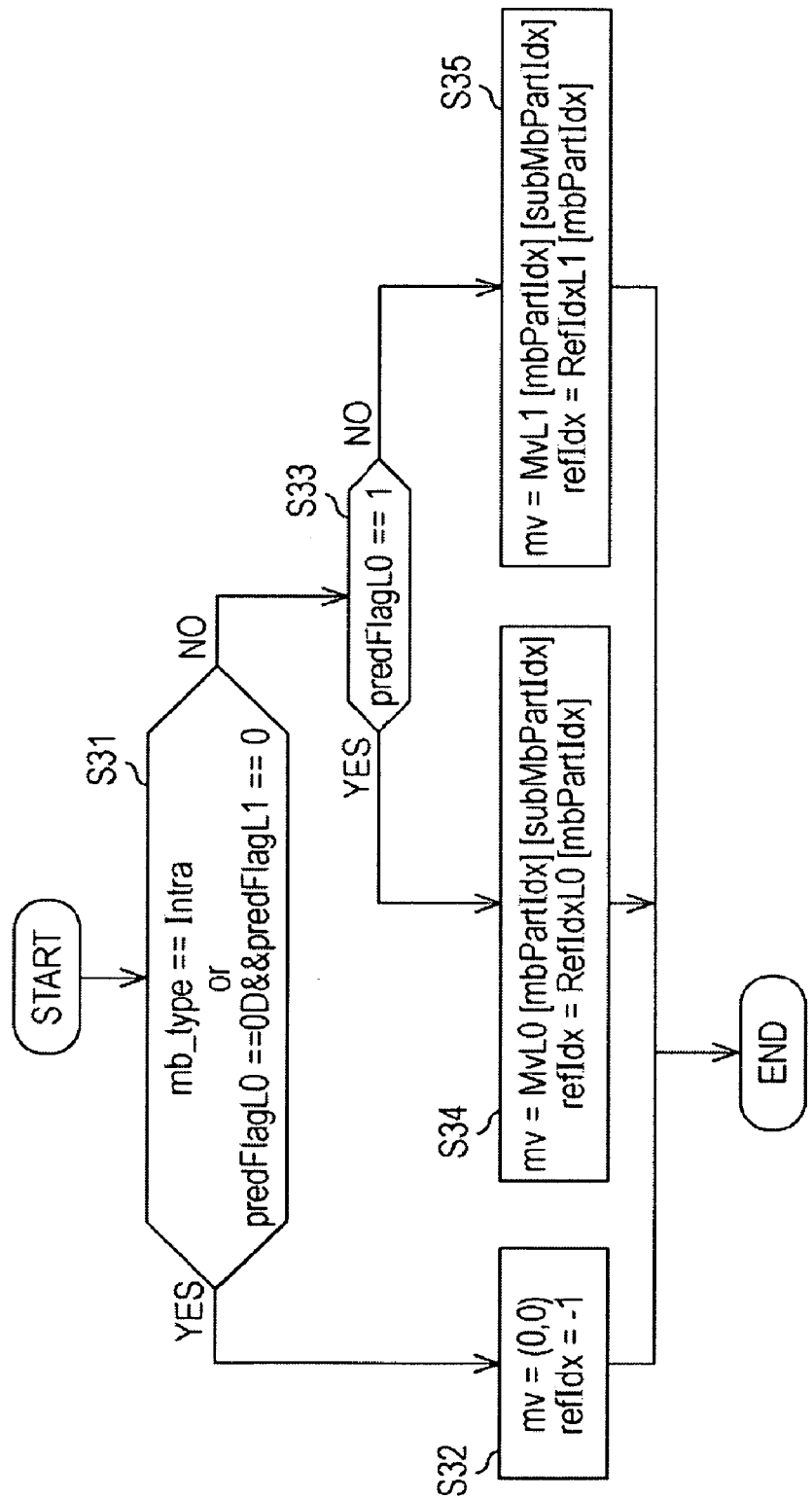
FIG. 10 is a flowchart illustrating a procedure performed by a macroblock information determining section.

In the foregoing description, it has been indicated that the amount of data to be stored into the parameter storage memory 19 by the macroblock information determining section 35 is reduced in comparison to the related art in accordance with the constraint of not using temporal direct mode but using spatial direct mode which is set by the setting section 36. Even when such a restriction is not imposed, that is, even when temporal direct mode is used, it is possible for the macroblock information determining section 35 to achieve a reduction in the size of data stored into the parameter storage memory 19 in comparison to the related art, by performing processing according to a flowchart shown in FIG. 10.

In step S31, as the first condition, the macroblock information determining section 35 determines whether or not the prediction type of the current macroblock to be coded, that is, the prediction type mb_type according to the prediction mode selected by the MD processing section 34 located at the previous stage is Intra. Further, as the second condition, the macroblock information determining section 35 determines whether or not the prediction mode predFlagL0 of L0 prediction of the current macroblock to be coded is 0, and the prediction mode predFlagL1 of L1 prediction is 0. The macroblock information determining section 35 proceeds to step S32 if the first condition or the second condition described above is satisfied, and proceeds to step S33 if neither of the determination conditions is satisfied.

In step S32, the macroblock information determining section 35 sets both the vertical and horizontal values of the motion vector of the current macroblock to be coded to 0. Further, the macroblock information determining section 35 sets the reference picture index refIdx of the current macroblock to be coded to −1. Then, the macroblock information determining section 35 stores the motion vector mv and the reference picture index refIdx thus set into the parameter storage memory 19.

In step S33, the macroblock information determining section 35 determines whether or not the prediction mode predFlagL0 of L0 prediction of the current macroblock to be coded is 1. The macroblock information determining section 35 proceeds to step S34 if this determination condition is satisfied, and proceeds to step S35 if this determination condition is not satisfied.

In step S34, the macroblock information determining section 35 sets the motion vector of the current macroblock to be coded to the motion vector MvL0[mbPartIdx] [subMbPartIdx] of L0 prediction of this macroblock. Further, the macroblock information determining section 35 sets the reference picture index refIdx of this macroblock to the reference picture index RefIdxL0[mbPartIdx] of L0 prediction of this macroblock. Then, the macroblock information determining section 35 stores the motion vector mv and the reference picture index refIdx thus set into the parameter storage memory 19.

In step S35, the macroblock information determining section 35 sets the motion vector of the current macroblock to be coded to the motion vector MvL1[mbPartIdx] [subMbPartIdx] of L1 prediction of this macroblock. Further, the macroblock information determining section 35 sets the reference picture index refIdx of this macroblock to the reference picture index RefIdxL1 [mbPartIdx] of L1 prediction of this macroblock. Then, the macroblock information determining section 35 stores the motion vector mv and the reference picture index refIdx thus set into the parameter storage memory 19.

Rather than storing motion vectors mv and reference picture indices refIdx related to both L0 prediction and L1 prediction into the parameter storage memory as information of the anchor block as in the related art, the macroblock information determining section 35 performing the above-mentioned procedure stores only the motion vector mv and reference picture index refIdx set by the processing of step S32, step S34, or step 335 into the parameter storage memory 19. Therefore, for example, as shown in FIG. 11, coding information of 440 bits per macroblock, or about 68[Byte] in total if alignment is taken into account, is stored in the parameter storage memory 19 for every parameter. That is, the coding apparatus 1 can reduce the required storage capacity of the parameter storage memory 19 to about half in comparison to the coding apparatus of the related art in which coding information with a data size of about 140[Byte] per macroblock in total is stored in the parameter storage memory.

Further, since it is specified by the AVC standard that subMbPartIdx=mbPartIdx in a case where the setting section 36 sets a constraint of restricting the macroblock size for a coding process in direct prediction mode to a 8×8 pixel block or more, as shown in FIG. 12, the macroblock information determining section 25 can store coding information with a data size of 128 bits per macroblock, or 20[Byte] in total if alignment is taken into account for every parameter, into the parameter storage memory 19. Therefore, in this case, the coding apparatus 1 can reduce the required storage capacity of the parameter storage memory 19 to about 1/7 of that in the above-described coding apparatus according to the related art.

Figure 13:
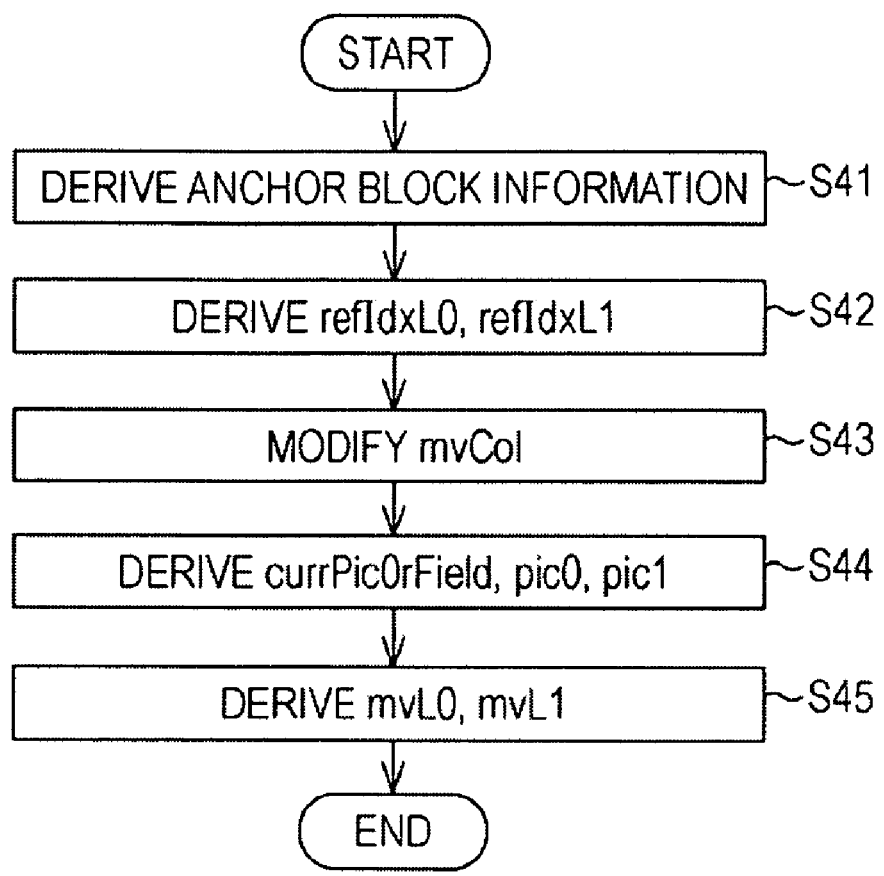
FIG. 13 is a flowchart illustrating a procedure by which an MV deriving section drives motion vectors.

Next, referring to a flowchart shown in FIG. 13, a description will be given of operation of the MV deriving section 37 that derives a motion vector by referring to the motion vector mvRef stored into the parameter storage memory 19 by the macroblock information determining section 35 as described above. As a precondition, motion vectors in temporal direct mode are computed by the setting section 36 through the following procedure.

In step S41, the MV deriving section 37 derives information related to an anchor block by inputting mbPartIdx and subPartIdx, and referring to information stored in the parameter storage memory 19, and proceeds to step S42.

In step 342, the MV deriving section 37 derives the reference picture index refIdxL0 of L0 prediction and the reference picture index refIdxL1 of L1 prediction from the information derived in step S41, and proceeds to step S43.

In step S43, the MV deriving section 37 modifies the motion vector mvCol of the anchor block and proceeds to step S44.

In step S44, the MV deriving section 37 derives the current picture to be coded currPic0rField, a picture pic0 with the lowest index of reference pictures of L0 prediction, and a picture pic1 with the lowest index of reference pictures of L1 prediction, and proceeds to step S45.

In step S45, the MV deriving section 37 derives the motion vector mvL0 of L0 prediction of the anchor block and the motion vector mvL1 of L1 prediction of the anchor block, from the relationship in display order between currPic0rField, pic0, and pic1 derived in step S44.

In this way, the MV deriving section 37 derives motion vectors in temporal direct mode. At this time, in step S41, the MV deriving section 37 can derive the motion vector of an anchor block corresponding to inputted mbPartIdx, subMbPartIdx only by referencing the parameter storage memory 19. This is because when the anchor block was a block to be coded in the past, the motion vector for the anchor block was obtained and stored into the parameter storage memory by the macroblock information determining section 35 in advance.

Therefore, with the coding apparatus 1 according to this embodiment, in accordance with the prediction mode selected by the MD processing section 34, the macroblock information determining section 35 determines information necessary for the MV deriving section 37 to derive the motion vector of a macroblock that has not been coded from information related to a macroblock to be coded, with this macroblock as a reference macroblock, and stores only information determined as necessary into the parameter storage memory 19, thereby making it possible to reduce the required storage capacity of the parameter storage memory 19 in comparison to the related art.

In this way, in the coding apparatus 1, the storage size of data stored into the parameter storage memory 19 can be reduced. Accordingly, for example, in the case of a configuration where the parameter storage memory 19 is connected to the ME/MD processing section 18 via a bus, the bandwidth required for data transmission between the parameter storage memory 19 and the ME/MD processing section 18 can be reduced.

Next, referring to FIG. 14, a description will be given of another mode of carrying out the present invention, by using a decoding apparatus 2 that takes in an image signal coded by the above-described coding apparatus 1 and applies decoding to the coded image signal.

Figure 14:
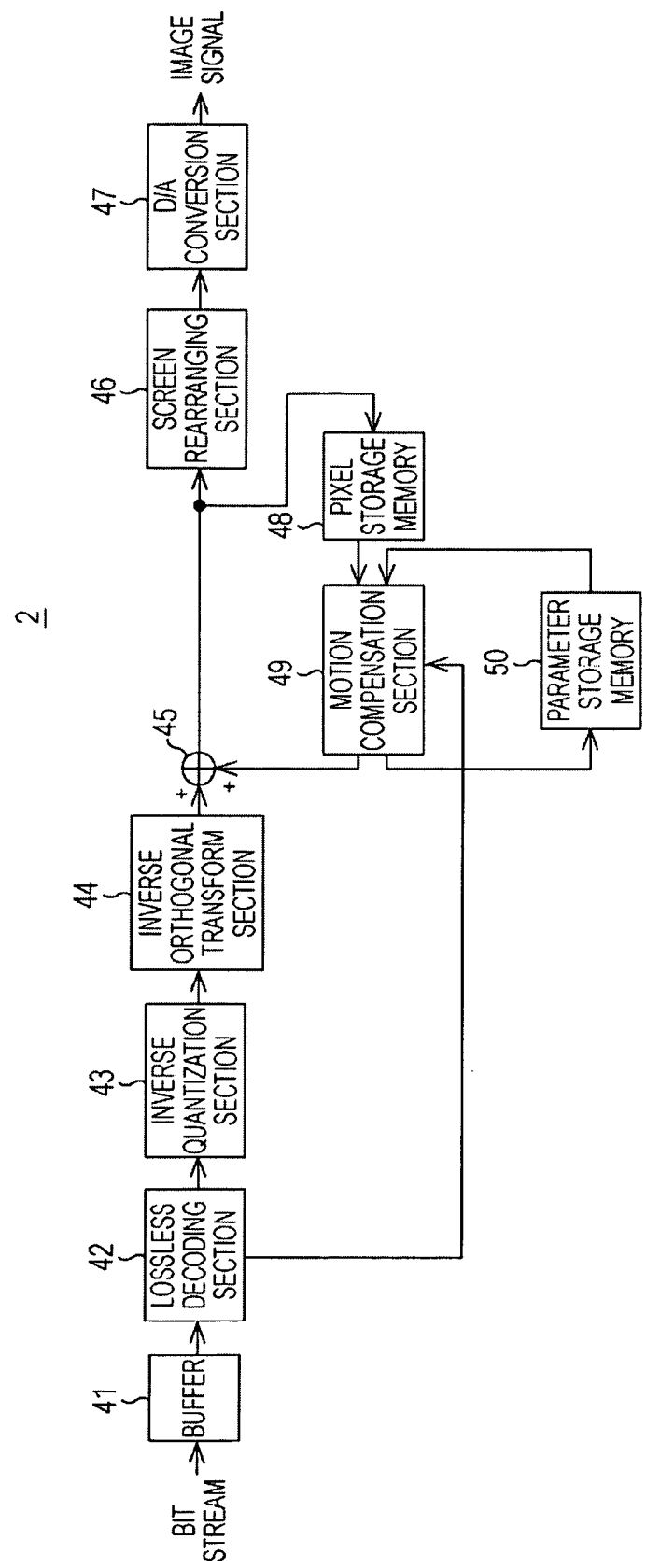
FIG. 14 is a block diagram showing the configuration of a decoding apparatus.

Specifically, as shown in FIG. 14, the coding apparatus 2 includes a buffer 41, a lossless decoding section 42, an inverse quantization section 43, an inverse orthogonal transform section 44, an adder 45, a screen rearranging section 46, a D/A conversion section 47, a pixel storage memory 48, a motion compensation section 49, and a parameter storage memory 50.

The buffer 41 temporarily stores an image signal coded by the above-described coding apparatus 1 or the like, and sequentially supplies the stored image signal to the lossless decoding section 42 while maintaining synchronization with other processing sections.

The lossless decoding section 42 applies processing such as variable length decoding or arithmetic decoding to the image signal supplied from the buffer 41, and supplies the resulting quantized orthogonal transform coefficients to the inverse quantization section 43. Further, the lossless decoding section 42 decodes coding information related to a prediction process such as motion vectors stored in the header portion of this image signal, and supplies the decoded coding information to the motion compensation section 49.

The inverse quantization section 43 applies inverse quantization to the quantized orthogonal transform coefficients supplied from the lossless decoding section 42, and supplies the resulting orthogonal transform coefficients to the inverse orthogonal transform section 44.

The inverse orthogonal transform section 44 applies an orthogonal transform such as inverse discrete cosine transform or inverse Karhunen-Loeve transform to the orthogonal transform coefficients generated by the inverse quantization section 43, and supplies a decoded pixel thus decoded to the adder 45.

The adder 45 adds the decoded pixel decoded by the inverse orthogonal transform section 44, and a predicted pixel supplied from the motion compensation section 49 described later together to thereby generate frame image data, and supplies the frame image data to the screen rearranging section 46.

The screen rearranging section 46 rearranges the frame image data supplied from the adder 45 in the temporal axis direction. Then, the screen rearranging section 46 supplies the frame image data thus rearranged in the temporal axis direction to the D/A conversion section 47 as a base band video signal.

The DIA conversion section 47 converts the base band video signal from a digital signal to an analog signal for output to a display device or the like.

The pixel storage memory 48 stores the frame image data supplied from the adder 45, as a reference pixel.

The motion compensation section 49 generates a predicted pixel in accordance with the coding information supplied from the lossless decoding section 42, and the reference pixel stored in the pixel storage memory 48, and supplies the predicted pixel to the adder 45.

The parameter storage memory 50 stores information related to previously decoded pictures, which is required for the motion compensation section 49 to decode the current macroblock to be decoded in skip/direct prediction mode described later, from among pieces of information generated by the motion compensation section 49.

Next, the specific configuration of the motion compensation section 49 and its operation will be described with reference to FIG. 15.

Figure 15:
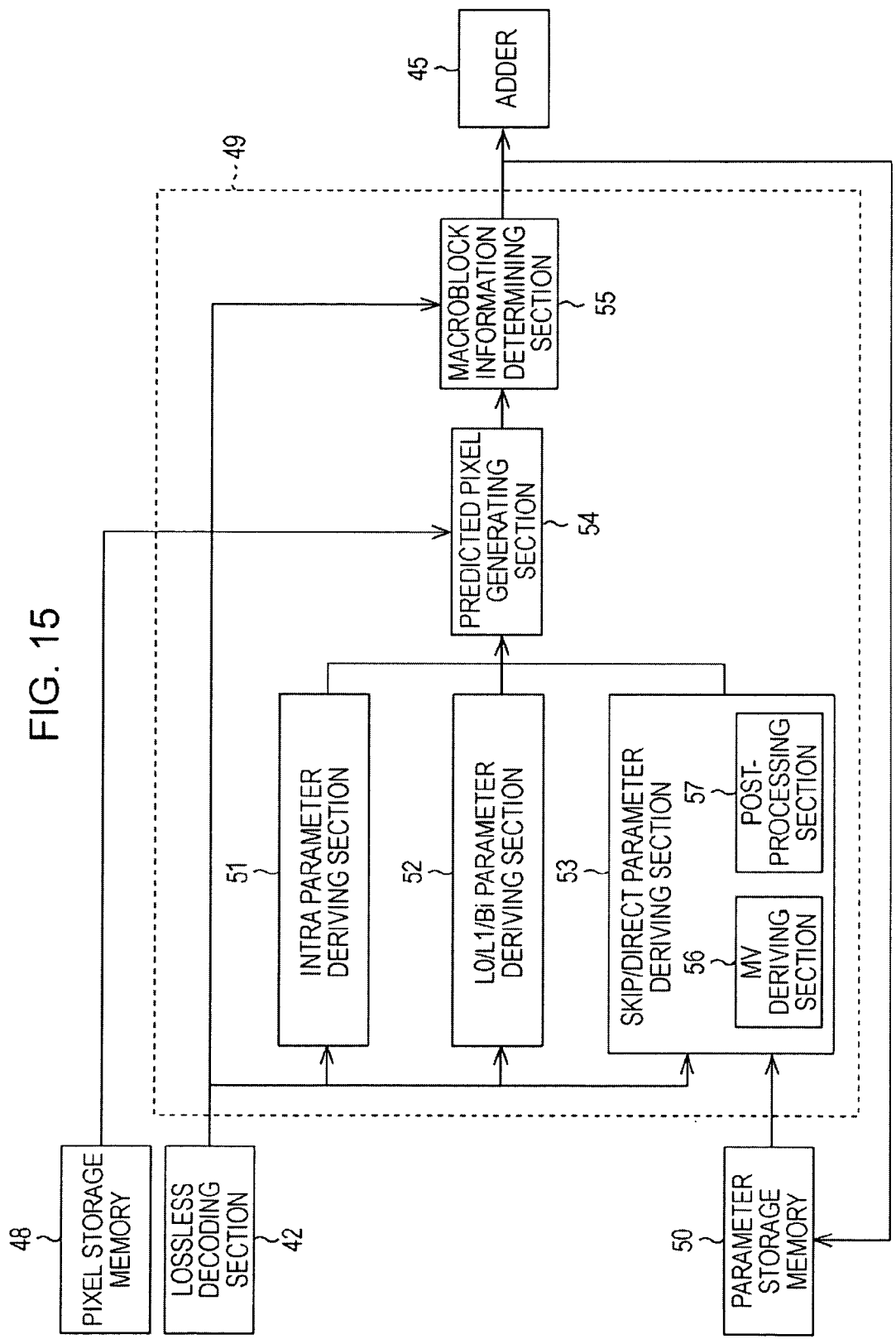
FIG. 15 is a block diagram showing the configuration of a motion compensation section.

As shown in FIG. 15, the motion compensation section 49 includes an intra parameter deriving section that derives intra parameters as information necessary for an intra prediction process from coding information, an L0/L1/Bi parameter deriving section 52 that derives L0/L1/Bi parameters as information necessary for an L0/L1/Bi prediction process from coding information, a skip/direct parameter deriving section 53 that derives skip/direct parameters as information necessary for a skip/direct prediction process from coding information, a predicted pixel generating section 54 that generates a predicted pixel from a reference pixel in accordance with the parameters derived by the respective deriving sections, and a macroblock information determining section 55 that performs a determination process related to information to be stored into the parameter storage memory 50.

The intra parameter deriving section 51 derives intra parameters as information necessary for an intra prediction process from coding information supplied from the lossless decoding section 42, and supplies the intra parameters to the predicted pixel generating section 54.

The L0/L1/Bi parameter deriving section 52 derives L0/L1/Bi parameters as information necessary for an L0/L1/

Bi prediction process from coding information supplied from the lossless decoding section 42, and supplies the L0/L1/Bi parameters to the predicted pixel generating section 54.

The skip/direct mode deriving section 53 derives information necessary for decoding macroblocks whose motion vectors are coded in direct prediction mode, from among macroblocks whose slice type is B slice. Specifically, the skip/direct mode deriving section 53 includes an MV deriving section 56 that derives motion vectors in spatial direct mode or temporal direct mode, and a post-processing section 57 that derives skip/direct parameters in accordance with the motion vectors derived by the MV deriving section 56.

The MV deriving section 56 refers to information stored in the parameter storage memory 50 to derive, from coding information supplied from the lossless decoding section 42, motion vectors in spatial direct mode or temporal direct mode as described later, and supplies the motion vectors to the post-processing section 57.

The post-processing section 57 derives skip/direct parameters by using the motion vectors supplied from the MV deriving section 56, and supplies the skip/direct parameters to the predicted pixel generating section 54.

The macroblock information determining section 55 causes a part of the derivation process performed by an MV deriving section in the related art to be performed in advance at the stage of decoding of a macroblock that can become a reference macroblock, thereby realizing a reduction in the amount of data stored into the parameter storage memory 50.

Specifically, the macroblock information determining section 55 performs a determination process in accordance with coding information supplied from the lossless decoding section 42.

Figure 16:
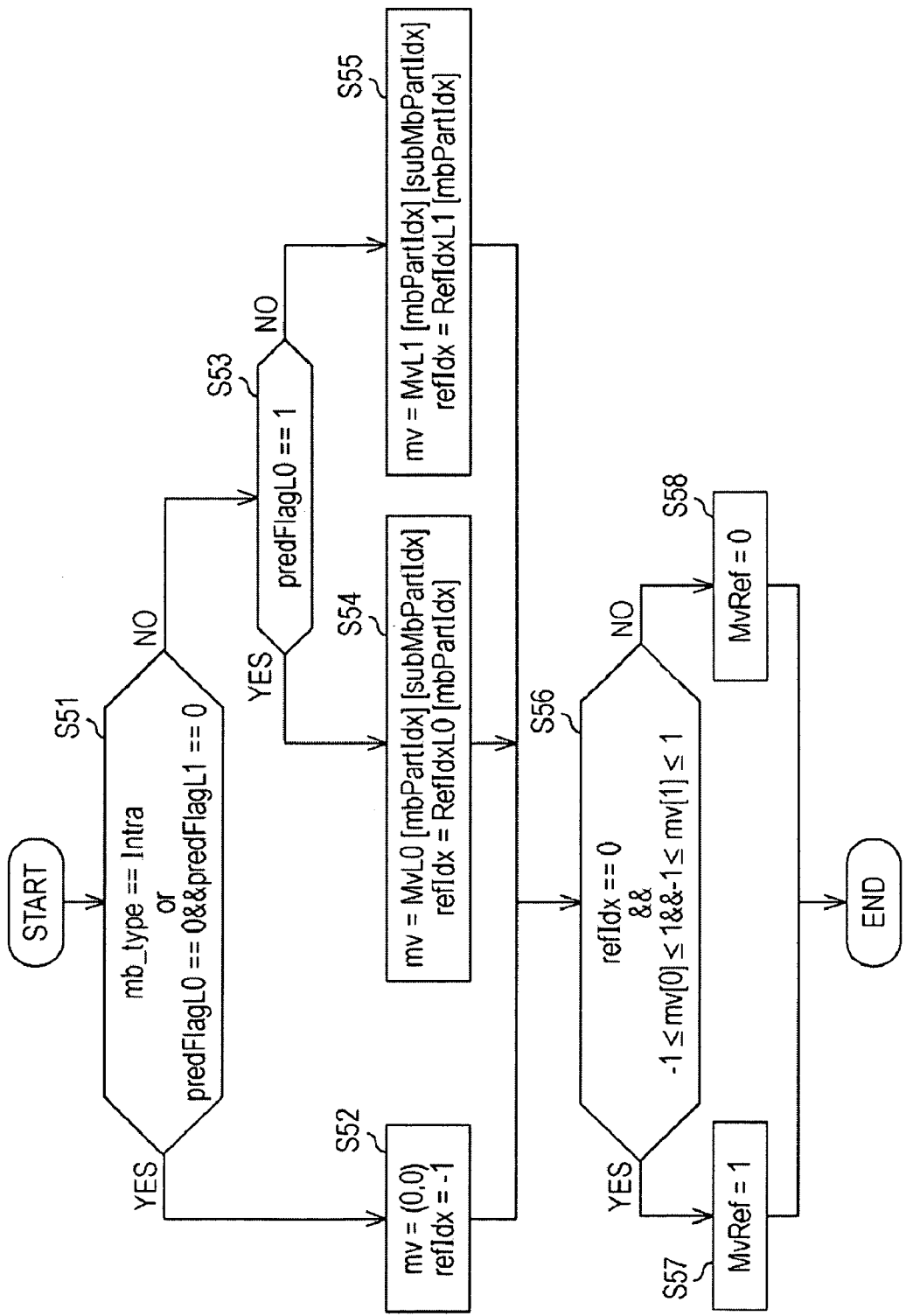
FIG. 16 is a flowchart illustrating a procedure performed by a macroblock information determining section.

First, the macroblock information determining section analyzes coding information supplied from the lossless coding section 42. Then, if a constraint of using only spatial direct mode from among direct prediction modes is set for an image signal, the macroblock information determining section 55 performs a determination process according to a flowchart shown in FIG. 16 so that only information necessary for deriving motion vectors in spatial direct mode is stored into the parameter storage memory 50.

In step S51, as the first condition, the macroblock information determining section 55 determines whether or not the prediction type mb_type of the current macroblock to be decoded, that is, the prediction type mb_type according to the prediction mode for a predicted pixel generated by the predicted pixel generating section 54 located at the previous stage is Intra. Further, as the second condition, the macroblock information determining section 55 determines whether or not the prediction mode predFlagL0 of L0 prediction of the current macroblock to be decoded is 0, and the prediction mode predFlagL1 of L1 prediction is 0. The macroblock information determining section 55 proceeds to step S52 if the first condition or the second condition described above is satisfied, and proceeds to step S53 if neither of the determination conditions is satisfied.

In step S52, the macroblock information determining section 55 sets both the vertical and horizontal values of the motion vector mv of the current macroblock to be decoded to 0. Further, the macroblock information determining section 55 sets the reference picture index refIdx of the current macroblock to be decoded to −1. Then, the macroblock information determining section 55 proceeds to step S56.

In step S53, the macroblock information determining section 55 determines whether or not the prediction mode predFlagL0 of L0 prediction of the current macroblock to be decoded is 1. The macroblock information determining section 55 proceeds to step S54 if this determination condition is satisfied, and proceeds to step S55 if this determination condition is not satisfied.

In step S54, the macroblock information determining section 55 sets the motion vector mv of the current macroblock to be decoded to the motion vector MvL0[mbPartIdx][subMbPartIdx] of L0 prediction of this macroblock. Further, the macroblock information determining section 55 sets the reference picture index refIdx of this macroblock to the reference picture index RefIdxL0[mbPartIdx] of L0 prediction of this macroblock. Then, the macroblock information determining section 55 proceeds to step S56.

In step S55, the macroblock information determining section 55 sets the motion vector of the current macroblock to be decoded to the motion vector MvL1[mbPartIdx][subMbPartIdx] of L1 prediction of this macroblock. Further, the macroblock information determining section 55 sets the reference picture index refIdx of this macroblock to the reference picture index RefIdxL1[mbPartIdx] of L1 prediction of this macroblock. Then, the macroblock information determining section 55 proceeds to step 356.

In step S56, as the first condition, the macroblock information determining section 55 determines whether or not the reference picture index refIdx of the current macroblock to be decoded which is set in the previous processing step is 0. Further, as the second condition, the macroblock information determining section 55 determines whether or not the values of the horizontal and vertical components of the motion vector mv of the current macroblock to be decoded which is set in the previous processing step are both ±1 or less. The macroblock information determining section 55 proceeds to step S57 if both of the first and second conditions are satisfied, and proceeds to step S58 if not both of the first and second conditions are satisfied.

In step S57, the macroblock information determining section 55 sets the values of reference macroblock motion vector MvRef to 1, and stores the set motion vector MvRef into the parameter storage memory 50 and terminates this procedure.

In step S58, the macroblock information determining section 55 sets the values of reference macroblock motion vector MvRef to 0, and stores the set motion vector MvRef into the parameter storage memory 50 and terminates this procedure.

Further, the macroblock information determining section 55 stores motion information for reference macroblock into the parameter storage memory 50 also when, in addition to the constraint of not using temporal direct mode but using spatial direct mode as described above, a constraint of restricting the macroblock size for a coding process in direct prediction mode to 8×8 or more is set for the coded image signal.

Figure 17:
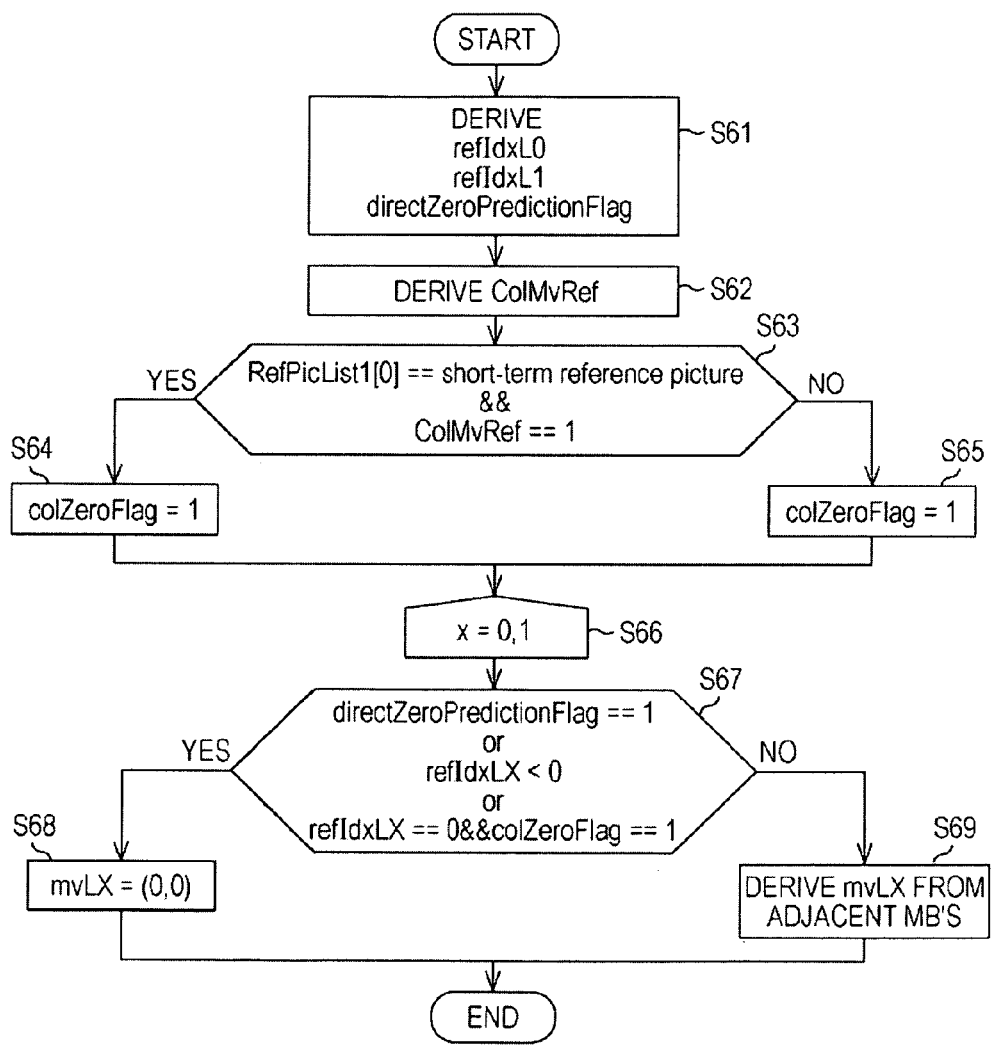
FIG. 17 is a flowchart illustrating a procedure by which an MV deriving section drives motion vectors.

Next, referring to a flowchart shown in FIG. 17, a description will be given of operation of the MV deriving section 56 that derives a motion vector by referring to the motion vectors MvRef stored into the parameter storage memory 50 by the macroblock information determining section 55 as described above.

Due to the precondition that the constraint of not using temporal direct mode but using spatial direct mode is set for a coded image signal, the MV deriving section 56 derives motion vectors in spatial direct mode by the following procedure.

In step 361, the MV deriving section 56 derives, from information related to adjacent macroblocks within the same picture, the reference picture indices refIdxL0 and refIdxL1 of L0 prediction and L1 prediction of the current macroblock to be decoded, and the flag directZeroPredictionFlag indicating whether or not a motion vector to be derived is 0. Then, the MV deriving section 56 proceeds to step S62.

In step S62, the MV deriving section 56 derives the motion vector ColMvRef of an anchor block by inputting mbPartIdx, subMbPartIdx to the current macroblock to be decoded, and referring to information store in the parameter storage memory 50.

In step S63, as the first condition, the MV deriving section 56 determines whether or not the picture type RefPicList1[0] of the lowest valued reference index of reference pictures of L1 prediction is short-term reference picture. Further, as the second condition, the MV deriving section 56 determines whether or not the motion vector ColMvRef of the anchor block derived in step S62 is 1. Then, the MV deriving section 56 proceeds to step S64 if both of the first and second conditions are satisfied, and proceeds to step S65 if not both of the first and second conditions are satisfied.

In step S64, the MV deriving section 56 sets the flag colzeroFlag to 1 and proceeds to step S66.

In step S65, the MV deriving section 56 sets the flag colZeroFlag to 0 and proceeds to step S66.

In step S66, the MV deriving section 56 derives the vector X representing the horizontal and vertical directions of the motion vector of the macroblock to be decoded, and proceeds to step S67.

In step S67, as the first condition, the MV deriving section 56 determines whether or not the value of the flag directZeroPredictionFlag derived in step S61 is 1. As the second condition, the MV deriving section 56 determines whether or not the reference picture indices refIdxL0 and refIdxL1 derived in step S61 are less than 0. Further, as the third condition, the MV deriving section 56 determines whether or not the reference picture indices refIdxL0 and refIdxL1 derived in step 361 are less than 0, and the flag colZeroFlag set in each of steps 364 and 365 is 1. Then, the MV deriving section 56 proceeds to step S68 if one of the above first to third conditions is satisfied, and proceeds to step S69 if all of the above first to third conditions are not satisfied.

In step S68, the MV deriving section 56 sets both the vertical and horizontal values of the motion vector mvLX of the macroblock to be decoded in spatial direct mode to 0, and terminates the procedure.

In step S69, the MV deriving section 56 derives the motion vector mvLX of the macroblock to be decoded in spatial direct mode by using motion information of adjacent macroblocks, and terminates the procedure.

In this way, the MV deriving section 56 derives motion vectors in spatial direct mode. At this time, in step S62, the MV deriving section 56 can derive the motion vector of the anchor block corresponding to inputted mbPartIdx, subMbPartIdx only by referencing the parameter storage memory 50.

Therefore, with the decoding apparatus 2 according to this embodiment, in accordance with the constraints set for a coded image signal, the macroblock information determining section 55 determines information necessary for the MV deriving section 56 to derive the motion vector of a macroblock that has not been decoded from information related to a macroblock to be decoded, with this macroblock as a reference macroblock, and stores only information determined as necessary into the parameter storage memory 50, thereby making it possible to reduce the required storage capacity of the parameter storage memory 50 in comparison to the related art.

Figure 18:
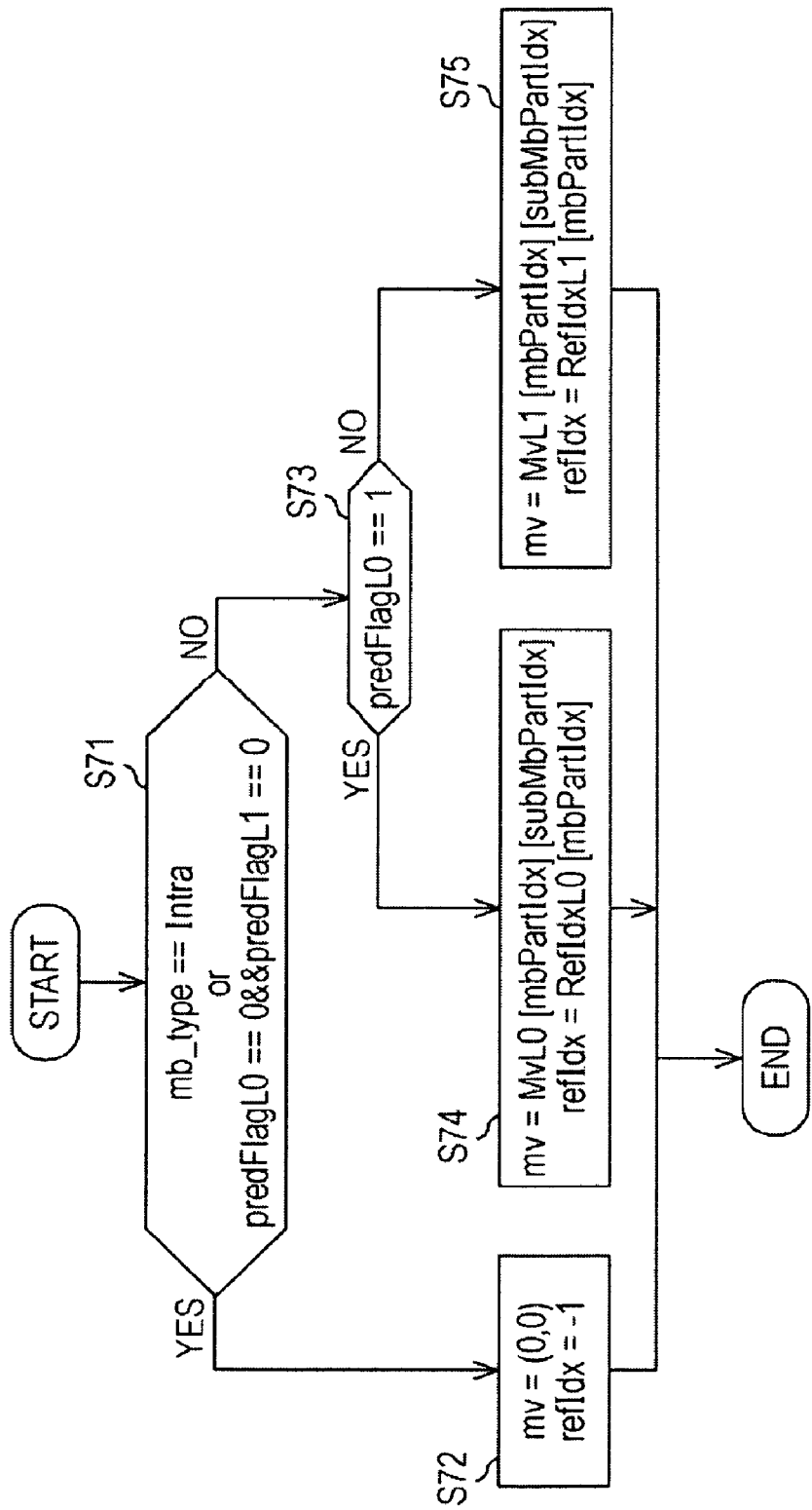
FIG. 18 is a flowchart illustrating a procedure performed by a macroblock information determining section.

In the foregoing description, it has been indicated that the amount of data to be stored into the parameter storage memory 50 by the macroblock information determining section 55 is reduced in comparison to the related art, in accordance with the constraint of not using temporal direct mode but using spatial direct mode. Even when such a restriction is not imposed, that is, even in the case of an image signal coded using temporal direct mode, it is possible for the macroblock information determining section 55 to achieve a reduction in the required storage capacity of the parameter storage memory 50 in comparison to the related art, by performing processing according to a flowchart shown in FIG. 18.

In step S71, as the first condition, the macroblock information determining section 55 determines whether or not the prediction type of the current macroblock to be decoded, that is, the prediction type mb_type according to the prediction mode for a predicted pixel generated by the predicted pixel generating section 54 located at the previous stage is Intra. Further, as the second condition, the macroblock information determining section 55 determines whether or not the prediction mode predFlagL0 of L0 prediction of the current macroblock to be decoded is 0, and the prediction mode predFlagL1 of L1 prediction is 0. The macroblock information determining section 55 proceeds to step S72 if the first condition or the second condition described above is satisfied, and proceeds to step S73 if neither of the determination conditions is satisfied.

In step S72, the macroblock information determining section 55 sets both the vertical and horizontal values of the motion vector of the current macroblock to be decoded to 0. Further, the macroblock information determining section 55 sets the reference picture index refIdx of the current macroblock to be decoded to −1. Then, the macroblock information determining section 55 stores the motion vector mv and the reference picture index refIdx thus set into the parameter storage memory 50.

In step S73, the macroblock information determining section 55 determines whether or not the prediction mode predFlagL0 of L0 prediction of the current macroblock to be decoded is 1. The macroblock information determining section 55 proceeds to step S74 if this determination condition is satisfied, and proceeds to step S75 if this determination condition is not satisfied.

In step S74, the macroblock information determining section 55 sets the motion vector of the current macroblock to be decoded to the motion vector MvL0[mbPartIdx] [subMbPartIdx] of L0 prediction of this macroblock. Further, the macroblock information determining section 55 sets the reference picture index refIdx of this macroblock to the reference picture index RefIdxL0[mbPartIdx] of L0 prediction of this macroblock. Then, the macroblock information determining section 55 stores the motion vector mv and the reference picture index refIdx thus set into the parameter storage memory 50.

In step S75, the macroblock information determining section 55 sets the motion vector of the current macroblock to be decoded to the motion vector MvL1[mbPartIdx] [subMbPartIdx] of L1 prediction of this macroblock. Further, the macroblock information determining section 55 sets the reference picture index refIdx of this macroblock to the reference picture index RefIdxL1[mbPartIdx] of L1 prediction of this macroblock. Then, the macroblock information determining section 55 stores the motion vector mv and the reference picture index refIdx thus set into the parameter storage memory 50.

Rather than storing motion vectors mv and reference picture indices refIdx related to both L0 prediction and L1 prediction into the parameter storage memory as information of the anchor block as in the related art, the macroblock information determining section 55 performing the above-mentioned procedure stores only the motion vector mv and reference picture index refIdx set by the processing of step S72, step S74, or step S75 into the parameter storage memory 50.

Therefore, the decoding apparatus 2 can reduce the required storage capacity of the parameter storage memory 50 to about half in comparison to the decoding apparatus of the related art.

It is specified by the AVC standard that subMbPartIdx=mbPartIdx in a case where a constraint of restricting the macroblock size for a coding process in direct prediction mode to 8×8 or larger is set for an image signal. Therefore, in this case, the decoding apparatus 2 can further reduce the required storage capacity of the parameter storage memory 50 in comparison to the related art.

Figure 19:
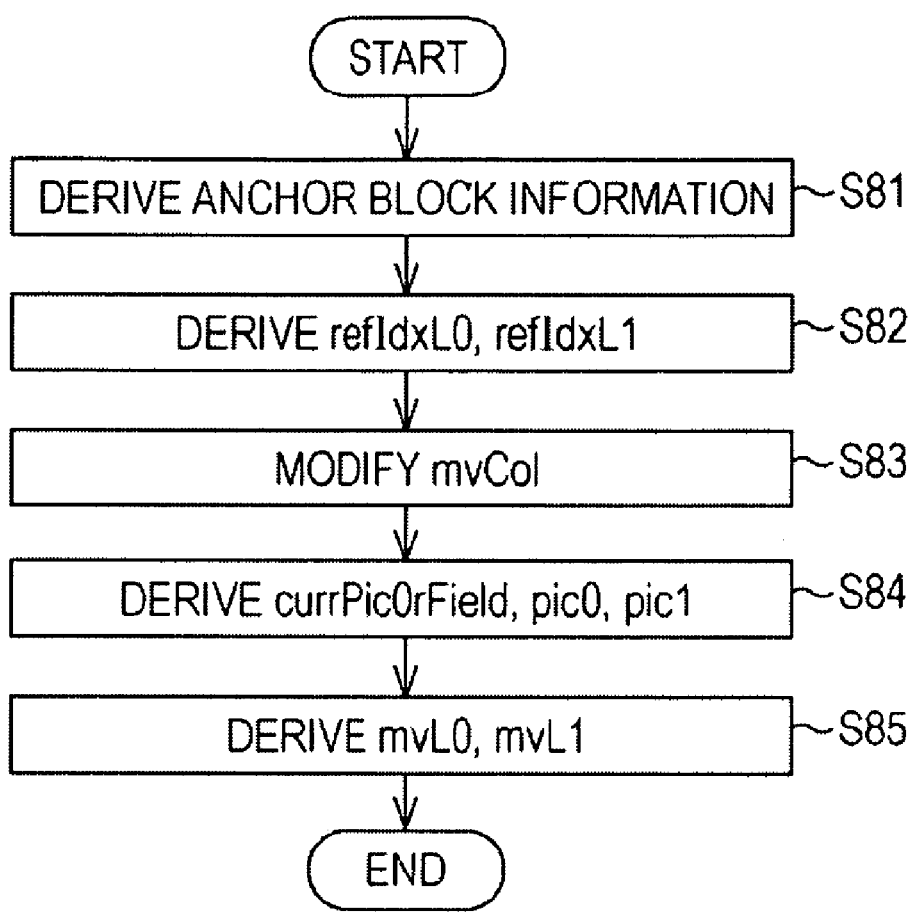
FIG. 19 is a flowchart illustrating a procedure by which an MV deriving section drives motion vectors.
Figure 20:
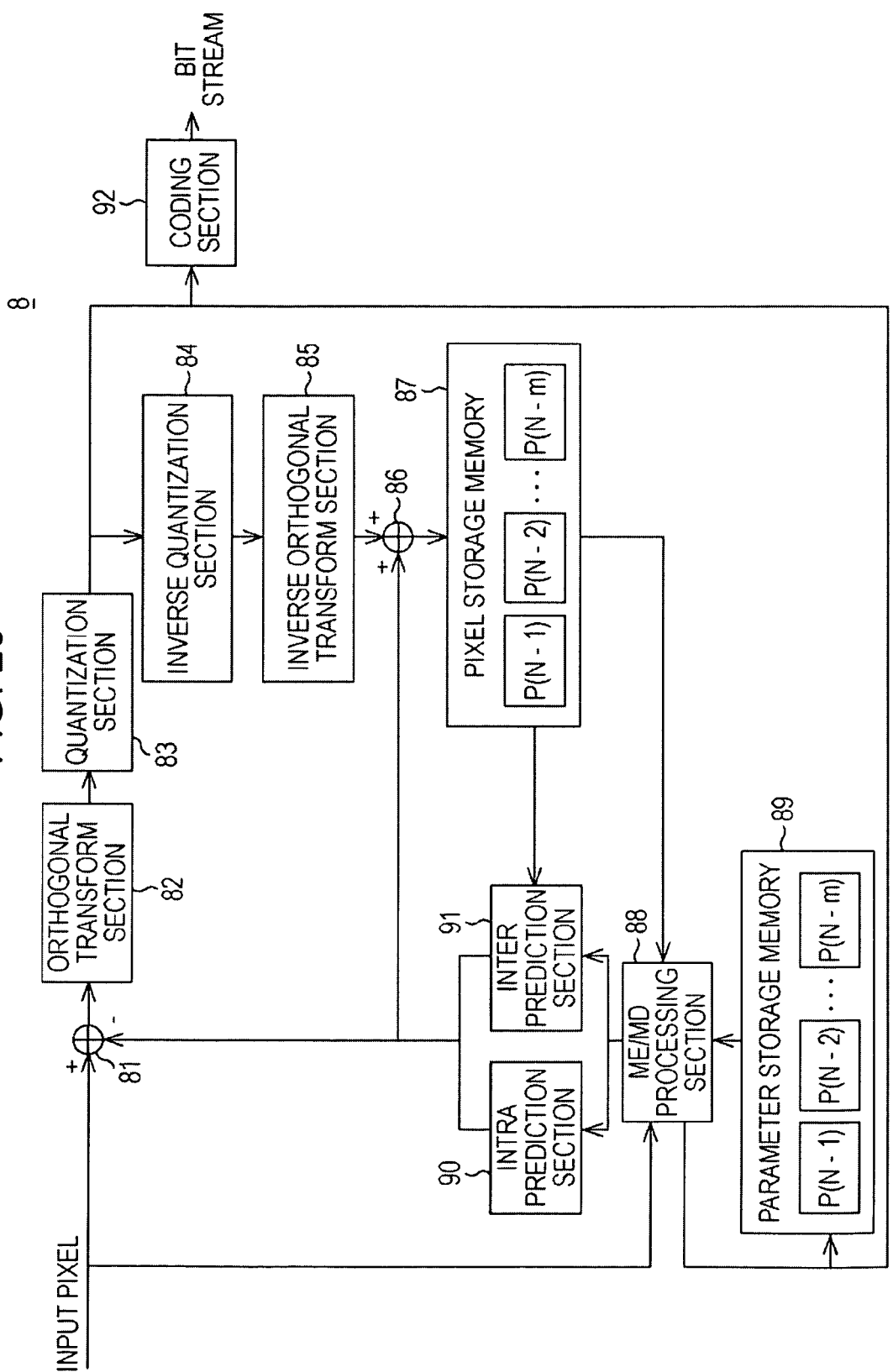
FIG. 20 is a block diagram showing the configuration of a coding apparatus according to the related art.
Figure 21:
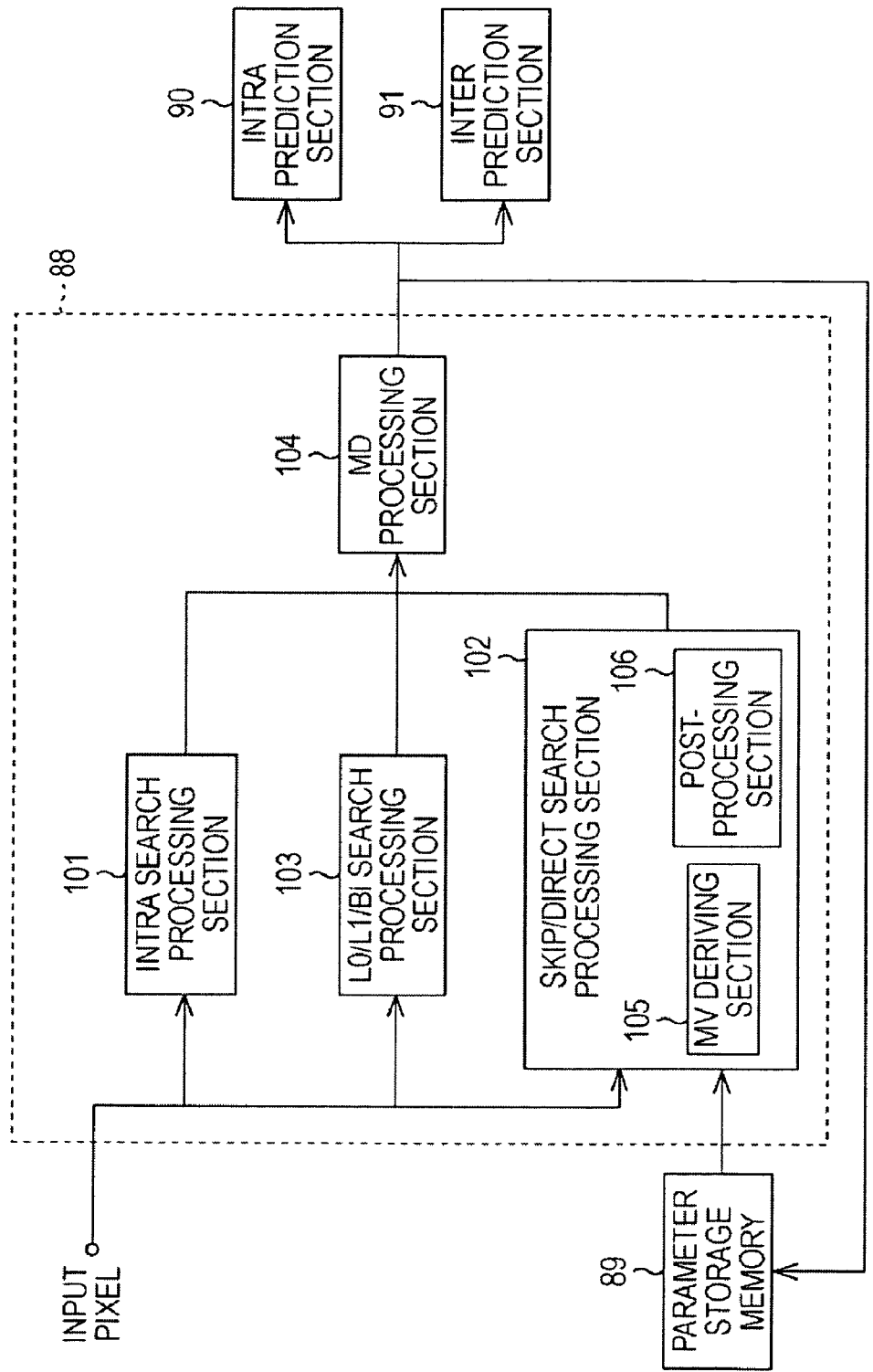
FIG. 21 is a block diagram showing the configuration of an ME/MD processing section.
Figure 22:
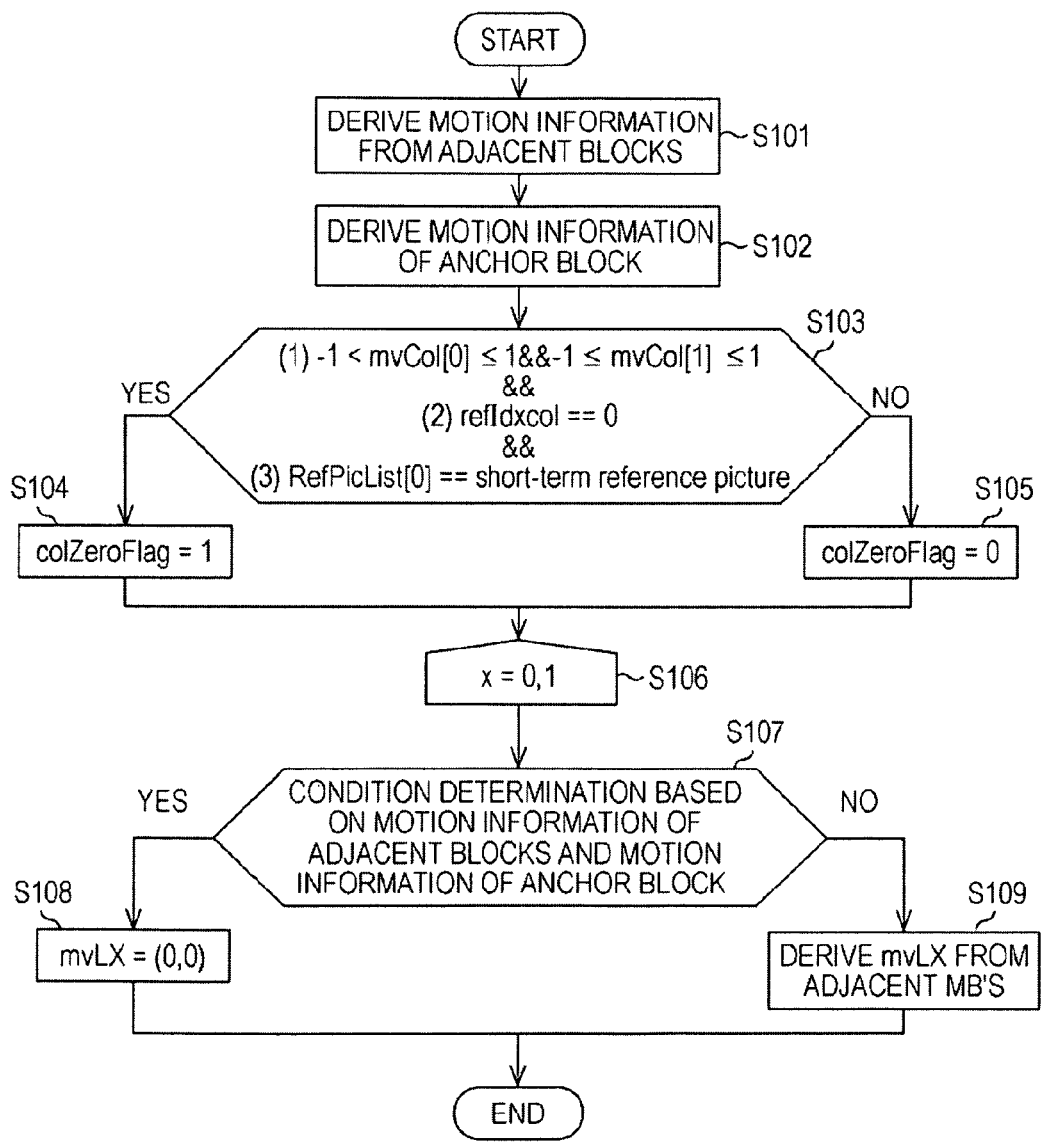
FIG. 22 is a flowchart illustrating a motion vector derivation process in spatial direct mode.
Figure 23:
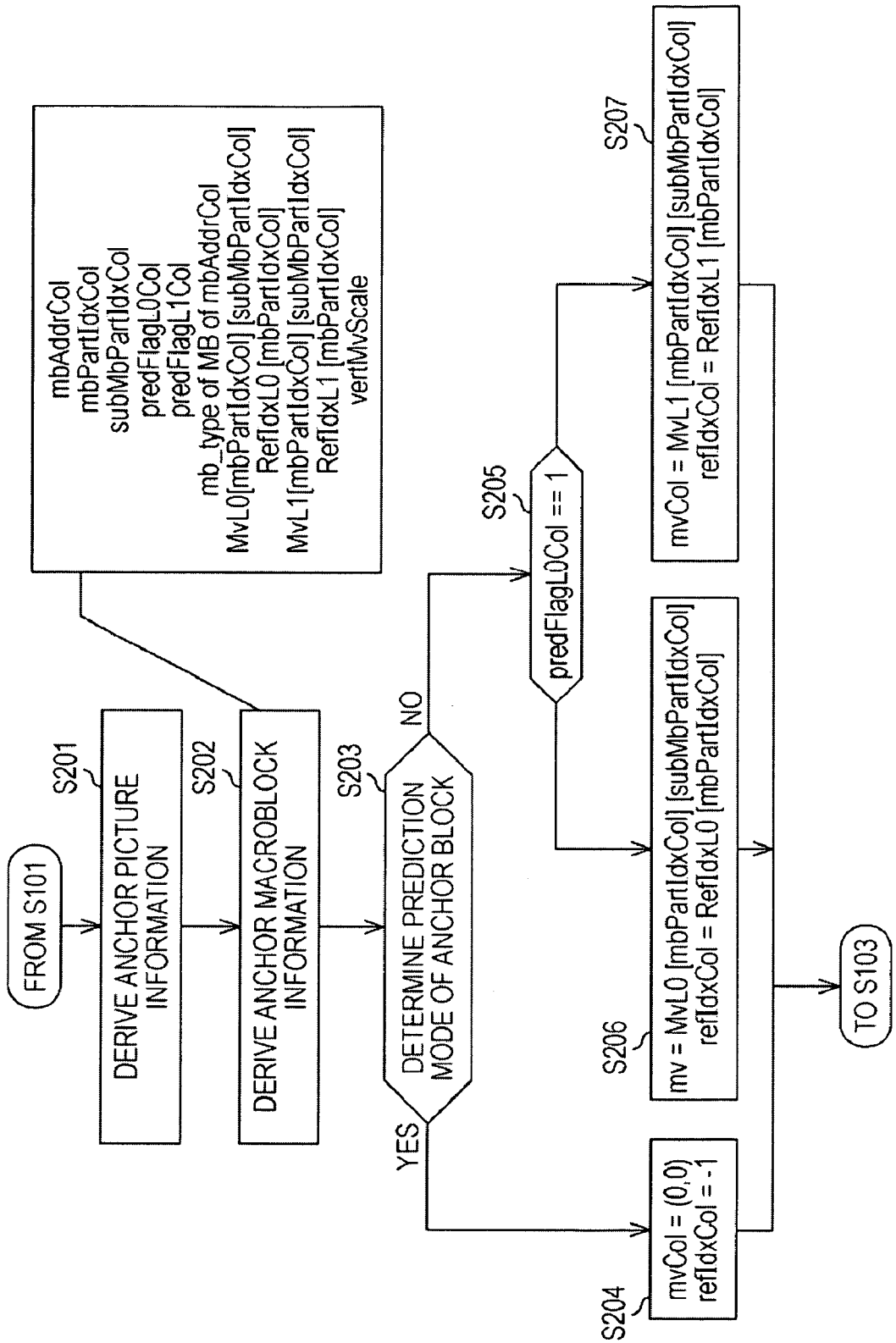
FIG. 23 is a flowchart illustrating a part of a motion vector derivation process in spatial direct mode.
Figure 24:
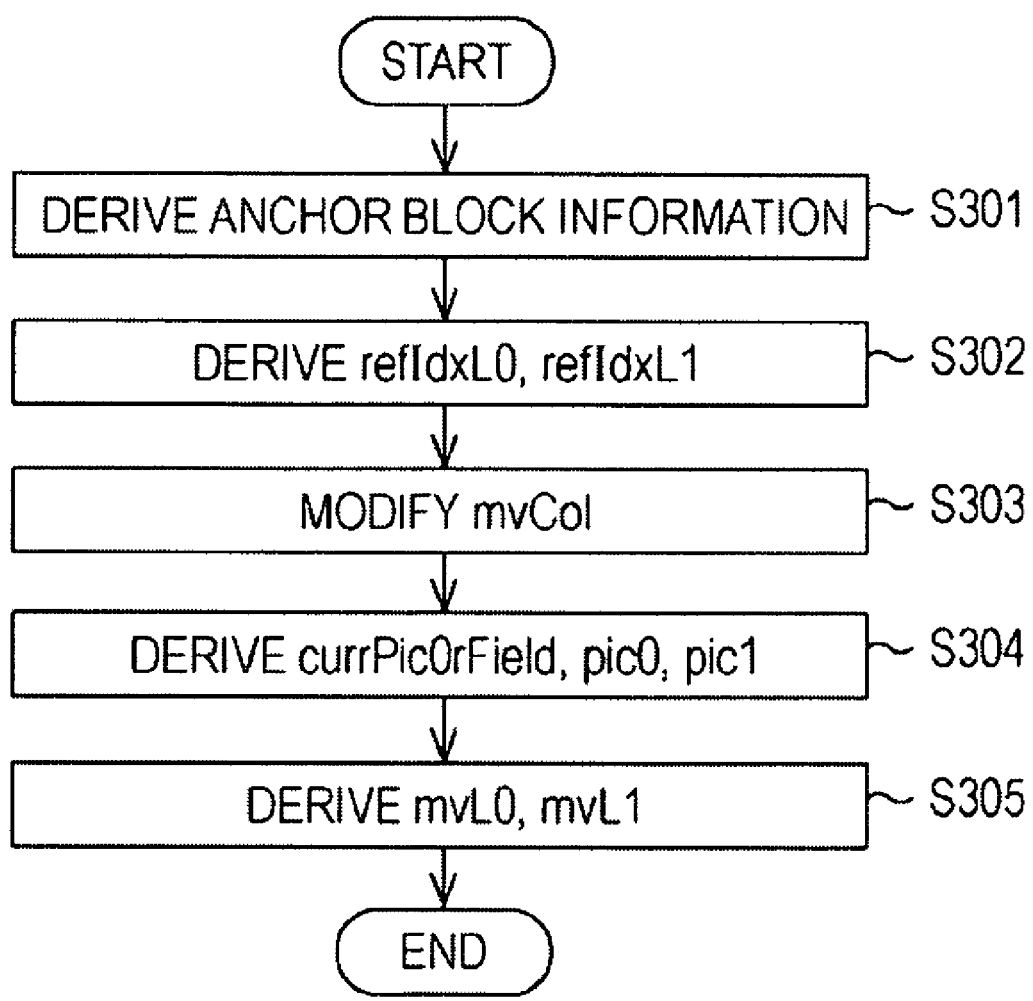
FIG. 24 is a flowchart illustrating a motion vector derivation process in temporal direct mode.

Next, referring to a flowchart shown in FIG. 19, a description will be given of operation of the MV deriving section 56 that derives a motion vector by referring to the motion vector mvRef stored into the parameter storage memory 50 by the macroblock information determining section 55 as described above. As a precondition, the MV deriving section computes motion vectors in temporal direct mode through the following procedure.

In step S81, the MV deriving section 56 derives information related to an anchor block by inputting mbPartIdx and subPartIdx, and referring to information stored in the parameter storage memory 50, and proceeds to step S82.

In step S82, the MV deriving section 56 derives the reference picture index refIdxL0 of L0 prediction and the reference picture index refIdxL1 of L1 prediction from the information derived in step S81, and proceeds to step S83.

In step S83, the MV deriving section 56 modifies the motion vector mvCol of the anchor block and proceeds to step S84.

In step S84, the MV deriving section 56 derives the current picture to be coded currPic0rField, a picture pic0 with the lowest index of reference pictures of L0 prediction, and a picture pic1 with the lowest index of reference pictures of L1 prediction, and proceeds to step S85.

In step S85, the MV deriving section 56 derives the motion vector mvL0 of L0 prediction of the anchor block and the motion vector mvL1 of L1 prediction of the anchor block, from the relationship in display order between currPic0rField, pic0, and pic1 derived in step S84.

In this way, the MV deriving section 56 derives motion vectors in temporal direct mode. At this time, in step S81, the MV deriving section 56 can derive the motion vector of the anchor block corresponding to inputted mbPartIdx, subMbPartIdx only by referencing the parameter storage memory 50. This is because when the anchor block was a block to be decoded in the past, the motion vector for the anchor block was obtained and stored into the parameter storage memory 50 by the macroblock information determining section 55 in advance.

Therefore, with the decoding apparatus 2 according to this embodiment, in accordance with the prediction mode for a prediction pixel generated by the prediction pixel generating section 54, the macroblock information determining section 55 determines information necessary for the MV deriving section 56 to derive the motion vector of a macroblock that has not been decoded from information related to a macroblock to be decoded, with this macroblock as a reference macroblock, and stores only information determined as necessary into the parameter storage memory 50, thereby making it possible to reduce the required storage capacity of the parameter storage memory 50 in comparison to the related art.

In this way, in the decoding apparatus 2, the storage size of data stored into the parameter storage memory 50 can be reduced. Accordingly, for example, in the case of a configuration where the parameter storage memory 50 is connected to the motion compensation section 49 via a bus, the bandwidth required for data transmission between the parameter storage memory 50 and the motion compensation section 49 can be reduced.

It is needless to mention that the present invention is not limited to the above-mentioned embodiments, and various modifications are possible without departing from the scope of the present invention.

What is claimed is:

1. A coding apparatus that applies coding to an image signal in a prediction mode and in units of an image area which conform to a predetermined coding scheme, and outputs the coded image signal, comprising:
   storage means for storing information used for coding an image area to be currently coded in a direct prediction mode that predicts motion information of an image area to be coded by referring to motion information of a previously coded image area;
   deriving means for deriving motion information of the image area in the direct prediction mode by referring to the information stored in the storage means;
   selecting means for selecting a prediction mode for coding the image area to be coded, in accordance with the motion information derived by the deriving means;
   setting means for setting a constraint of using, as the direct prediction mode, a prediction mode that derives motion information of the image area to be coded only by referring to, within a picture in which the image area to be coded is located, motion information of an image area to which the coding has been applied; and
   determining means for determining whether or not one or more pieces of information is necessary for the deriving means to derive motion information of an image area to which the coding has not been applied, from coding information applied in the prediction mode selected by the selecting means to the image area to be coded, in accordance with the constraint set by the setting means, and storing only information that is determined to be necessary to derive motion information, into the storage means,
   wherein the necessary information being stored comprises information as to whether or not the value of an anchor motion vector is ±1 or less, but excludes the specific value of the anchor motion vector.

2. The coding apparatus according to claim 1, further comprising:
   setting means for setting a constraint of restricting an image size of the image area to a predetermined pixel count or more,
   wherein the determining means determines information necessary for the deriving means to derive motion information of an image area to which the coding has not been applied, from coding information applied in the prediction mode selected by the selecting means to the image area to be coded, in accordance with the constraint set by the setting means, and stores only information determined as necessary into the storage means.

3. The coding apparatus according to claim 1, wherein the predetermined coding scheme is a scheme conforming to an H.264/MPEG-4 AVC standard.

4. A coding method for applying coding to an image signal in a prediction mode and in units of an image area which conform to a predetermined coding scheme, and outputting the coded image signal, comprising the steps of:

deriving motion information of the image area in a direct prediction mode, which predicts motion information of an image area to be coded by referring to motion information of a previously coded image area, by referring to information stored in storage means for storing information used for coding an image area to be currently coded in the direct prediction mode;

selecting a prediction mode for coding the image area to be coded, in accordance with the derived motion information;

setting a constraint of using, as the direct prediction mode, a prediction mode that derives motion information of the image area to be coded only by referring to, within a picture in which the image area to be coded is located, motion information of an image area to which the coding has been applied; and determining whether or not one or more pieces of information is necessary for deriving motion information of an image area to which the coding has not been applied, from coding information applied in the selected prediction mode to the image area to be coded, in accordance with the constraint set, and storing only information that is determined to be necessary for deriving motion information, into the storage means, wherein the necessary information being stored comprises information as to whether or not the value of an anchor motion vector is ±1 or less, but excludes the specific value of the anchor motion vector.

5. A decoding apparatus that decodes coded data obtained by applying coding to an image signal in a prediction mode and in units of an image area which conform to a predetermined coding scheme, comprising:

storage means for storing information used for decoding an image area to be currently decoded in a direct prediction mode that predicts motion information of an image area to be decoded by referring to motion information of a previously decoded image area;

deriving means for deriving motion information of the image area in the direct prediction mode by referring to the information stored in the storage means;

setting means for setting a constraint of using, as the direct prediction mode, a prediction mode that derives motion information of the image area to be decoded only by referring to, within a picture in which the image area to be decoded is located, motion information of an image area to which the decoding has been applied; and determining means for determining whether or not one or more pieces of information is necessary for the deriving means to derive motion information of an image area to which the decoding has not been applied, from the motion information of the image area derived by the deriving means, in accordance with the constraint set by the setting means, and storing only information that is determined to be necessary for deriving motion information, into the storage means, wherein the necessary information being stored comprises information as to whether or not the value of an anchor motion vector is ±1 or less, but excludes the specific value of the anchor motion vector.

6. The decoding apparatus according to claim 5, wherein:

a constraint of restricting an image size of the image area to a predetermined pixel count or more is set for the coded data; and the determining means determines information necessary for the deriving means to derive motion information of an image area to which the decoding has not been applied, from the motion information of the image area derived by the deriving means, in accordance with the constraint, and stores only information determined as necessary into the storage means.

7. The decoding apparatus according to claim 5, wherein the predetermined coding scheme is a scheme conforming to an H.264/MPEG-4 AVC standard.

8. A decoding method for decoding coded data obtained by applying coding to an image signal in a prediction mode and in units of an image area which conform to a predetermined coding scheme, comprising the steps of:

deriving motion information of the image area in a direct prediction mode, which predicts motion information of an image area to be decoded by referring to motion information of a previously decoded image area, by referring to information stored in storage means for storing information used for decoding an image area to be currently decoded in the direct prediction mode;

setting a constraint of using, as the direct prediction mode, a prediction mode that derives motion information of the image area to be decoded only by referring to, within a picture in which the image area to be decoded is located, motion information of an image area to which the decoding has been applied; and determining whether or not one or more pieces of information is necessary for deriving motion information of an image area to which the decoding has not been applied, from the derived motion information of the image area, in accordance with the constraint set, and storing only information that is determined to be necessary for deriving motion information, into the storage means, wherein the necessary information being stored comprises information as to whether or not the value of an anchor motion vector is ±1 or less, but excludes the specific value of the anchor motion vector.

9. A coding apparatus that applies coding to an image signal in a prediction mode and in units of an image area which conform to a predetermined coding scheme, and outputs the coded image signal, comprising:

a storage section that stores information used for coding an image area to be currently coded in a direct prediction mode that predicts motion information of an image area to be coded by referring to motion information of a previously coded image area;

a deriving section that derives motion information of the image area in the direct prediction mode by referring to the information stored in the storage section;

a selecting section that selects a prediction mode for coding the image area to be coded, in accordance with the motion information derived by the deriving section;

a setting section that sets a constraint of using, as the direct prediction mode, a prediction mode that derives motion information of the image area to be coded only by referring to, within a picture in which the image area to be coded is located, motion information of an image area to which the coding has been applied; and a determining section that determines whether or not one or more pieces of information is necessary for the deriving section to derive motion information of an image area to which the coding has not been applied, from coding information applied in the prediction mode selected by the selecting section to the image area to be coded, in accordance with the constraint set by the setting means, and stores only information that is determined to be necessary for deriving motion information, into the storage section, wherein the necessary information being stored comprises information as to whether or not the value of an anchor motion vector is ±1 or less, but excludes the specific value of the anchor motion vector.

10. A decoding apparatus that decodes coded data obtained by applying coding to an image signal in a prediction mode and in units of an image area which conform to a predetermined coding scheme, comprising:
- a storage section that stores information used for decoding an image area to be currently decoded in a direct prediction mode that predicts motion information of an image area to be decoded by referring to motion information of a previously decoded image area;
- a deriving section that derives motion information of the image area in the direct prediction mode by referring to the information stored in the storage section;
- a setting section that sets a constraint of using, as the direct prediction mode, a prediction mode that derives motion information of the image area to be decoded only by referring to, within a picture in which the image area to be decoded is located, motion information of an image area to which the decoding has been applied; and
- a determining section that determines whether or not one or more pieces of information is necessary for the deriving section to derive motion information of an image area to which the decoding has not been applied, from the motion information of the image area derived by the deriving section, in accordance with the constraint set by the setting means, and storing only information that is determined to be necessary to derive motion information, into the storage section, wherein the necessary information being stored comprises information as to whether or not the value of an anchor motion vector is ±1 or less, but excludes the specific value of the anchor motion vector.

* * * * *